US008257455B2

(12) United States Patent
Lee et al.

(10) Patent No.: US 8,257,455 B2
(45) Date of Patent: Sep. 4, 2012

(54) PLASMA BURNER AND DIESEL PARTICULATE FILTER TRAP

(75) Inventors: Dae-Hoon Lee, Daejeon (KR); Kwan-Tae Kim, Daejeon (KR); Young-Hoon Song, Daejeon (KR); Min-Suk Cha, Daejeon (KR); Jae-Ok Lee, Daejeon (KR)

(73) Assignee: Korea Institute of Machinery & Materials, Daejeon (KR)

( * ) Notice: Subject to any disclaimer, the term of this patent is extended or adjusted under 35 U.S.C. 154(b) by 826 days.

(21) Appl. No.: 12/134,557

(22) Filed: Jun. 6, 2008

(65) Prior Publication Data

US 2009/0031703 A1 Feb. 5, 2009

(30) Foreign Application Priority Data

Jul. 30, 2007 (KR) ........................ 10-2007-0076387
Aug. 6, 2007 (KR) ........................ 10-2007-0078579
Aug. 6, 2007 (KR) ........................ 10-2007-0078580
Aug. 6, 2007 (KR) ........................ 10-2007-0078581
Dec. 18, 2007 (KR) ........................ 10-2007-0133306

(51) Int. Cl.
*B01D 46/00* (2006.01)

(52) U.S. Cl. ................... 55/282.3; 55/523; 55/DIG. 10; 55/DIG. 30

(58) Field of Classification Search ............ 55/522–524, 55/282.3, 297–303, 274; 60/297–303, 274; 422/169–172, 177–182
See application file for complete search history.

(56) References Cited

U.S. PATENT DOCUMENTS 3,246,114 A * 4/1966 Matvay ......................... 427/446
3,459,376 A * 8/1969 Lothar et al. ............... 239/132.3
4,369,919 A * 1/1983 Beloev et al. ................... 239/79
4,424,671 A * 1/1984 Tokura ............................ 60/274
4,541,239 A * 9/1985 Tokura et al. .................... 60/286
4,608,640 A * 8/1986 Shinzawa et al. ............. 701/101
4,651,524 A * 3/1987 Brighton ......................... 60/274
4,662,172 A * 5/1987 Shinzawa et al. ............... 60/303
5,001,899 A 3/1991 Santiago et al.
5,206,481 A * 4/1993 Rossner et al. .......... 219/121.48

(Continued)

FOREIGN PATENT DOCUMENTS

JP 2007-518921 7/2007

(Continued)

OTHER PUBLICATIONS

Dae et al., English Translation of KR 10-0699495 PM Reduction Equipment of DPF System us Plasma Reactor, Korea, p. 7-8.*

(Continued)

*Primary Examiner* — Duane Smith
*Assistant Examiner* — Amber Orlando
(74) *Attorney, Agent, or Firm* — Lexyoume IP Meister, PLLC.

(57) ABSTRACT

A plasma burner and a diesel particulate filter (DPF) trap that can effectively oxidize and remove a particulate material (PM) within an exhaust gas by preheating fuel and mixing the fuel with the exhaust gas are provided. The DPF includes: a filter that is connected to an exhaust conduit at a side opposite to that of an engine; a plasma burner that is provided within the exhaust conduit between the engine and the filter, and that includes a fuel inlet that supplies fuel and a flame vent that projects a flame by a plasma discharge, and that heats exhaust gas; and a fuel inflow conduit that connects the fuel inlet and a fuel tank.

15 Claims, 32 Drawing Sheets

U.S. PATENT DOCUMENTS

| | | | | |
|---|---|---|---|---|
| 5,826,428 | A * | 10/1998 | Blaschke | 60/303 |
| 5,988,070 | A * | 11/1999 | Krumm et al. | 102/430 |
| 2002/0194835 | A1* | 12/2002 | Bromberg et al. | 60/275 |
| 2007/0251216 | A1* | 11/2007 | Easley et al. | 60/285 |

FOREIGN PATENT DOCUMENTS

| | | | |
|---|---|---|---|
| JP | 2009-511247 | | 3/2009 |
| KR | 10-1993-0003921 | | 5/1993 |
| KR | 10-1999-0027818 | | 4/1999 |
| KR | 10-0622135 | | 9/2006 |
| KR | 10-0638639 | | 10/2006 |
| KR | 10-0679869 | B1 | 2/2007 |
| KR | 10-0692948 | B1 | 3/2007 |
| KR | 10-0699495 | B1 | 3/2007 |
| KR | 10-0815601 | B1 | 3/2008 |
| WO | 2007/022926 | | 3/2007 |
| WO | 2007-037652 | | 4/2007 |
| WO | 2008-016225 | | 2/2008 |

OTHER PUBLICATIONS

European Patent Office, European Search Report for Patent Application No. 11181993.4, Dec. 22, 2011.

* cited by examiner

500

PLASMA BURNER AND DIESEL PARTICULATE FILTER TRAP

CROSS-REFERENCE TO RELATED APPLICATION

This application claims priority to and the benefit of Korean Patent Application Nos. 10-2007-0076387, 10-2007-0078579, 10-2007-0078580, 10-2007-0078581, and 10-2007-0133306 filed in the Korean Intellectual Property Office on Jul. 30, 2007, Aug. 6, 2007, Aug. 6, 2007, Aug. 6, 2007, and Dec. 18, 2007 the entire contents of which are incorporated herein by reference.

BACKGROUND OF THE INVENTION (a) Field of the Invention

The present invention relates to a plasma burner and a diesel particulate filter trap. More particularly, the present invention relates to a plasma burner and a diesel particulate filter trap that can effectively oxidize and remove particulate materials (PM) within exhaust gas by preheating fuel and mixing the fuel with the exhaust gas.

The present invention relates to a plasma burner and a diesel particulate filter trap that can effectively oxidize and remove PMs within an exhaust gas by providing and preheating a plasma burner within an exhaust conduit and that can maximally use space around the exhaust conduit.

(b) Description of the Related Art

PMs of exhaust gas of an automobile are mainly discharged from a diesel engine. A diesel engine adjusts output thereof with a mixture ratio of air and fuel, and in order to instantly output high power, a supply amount of fuel with respect to a predetermined amount of air should be increased. In this case, some of the fuel is incompletely burned due to insufficiency of an air amount to generate a large amount of smoke.

Further, when a diesel engine is operated, because a high pressure injection period of fuel is short, a dense region locally occurs within a combustion chamber, and thus a large amount of smoke is generated.

A diesel particulate filter (DPF) trap is a device that traps PMs that are discharged from a diesel engine in a filter and that oxidizes the PMs, and can reduce PMs by 80% or more. For trapping and oxidizing PMs, technology that reproduces a filter and a DPF that trap the PMs and that extends a lifetime thereof is important.

As a reproduction method of the DPF, there is a compulsive reproduction method of compulsively oxidizing PMs that are trapped in a reproduction process. The compulsive reproduction method is a method of compulsively heating using an electric heater, a burner, or by throttling. Because vehicles operating in cities sustain a low temperature of discharge gas, the vehicles partially use the compulsive reproduction method.

In the compulsive reproduction method, an electric heater has a drawback in that it consumes a significant amount of electric power. Because the burner uses oxygen in the exhaust gas, the burner causes operation control to be difficult according to a changing condition of oxygen within the exhaust gas according to an operation state. Throttling lowers the oxidation temperature of PM in an oxidation catalyst, but has a drawback in that a device for throttling should be attached to an air inflow conduit and an air outflow conduit.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a plasma burner and a DPF having advantages of effectively oxidizing and removing PM within exhaust gas by preheating fuel and mixing the fuel with the exhaust gas.

The present invention has been made in an effort to provide a plasma burner and a DPF having advantages of effectively oxidizing and removing PM within exhaust gas by providing and preheating a plasma burner within an exhaust conduit and maximally using space around the exhaust conduit.

An exemplary embodiment of the present invention provides a DPF including: a filter that is connected to an exhaust conduit at a side opposite to that of an engine; a plasma burner that is provided within the exhaust conduit between the engine and the filter, that includes a fuel inlet that supplies fuel and a flame vent that projects a flame by a plasma discharge, and that heats exhaust gas; and a fuel inflow conduit that connects the fuel inlet and a fuel tank.

The plasma burner may include at least one exhaust gas inlet that injects exhaust gas for ejecting fuel that is injected to the fuel inlet and that supplies exhaust gas for discharging to a mixed gas of the fuel and the exhaust gas.

The plasma burner may include a base that includes a mixture chamber in which the fuel inlet and the exhaust gas inlet are formed; an electrode that is mounted in the base with an insulator interposed therebetween, and that has a heat-absorbing chamber at the inside thereof, and that mixes and heats fuel and an exhaust gas that are injected from the fuel inlet and the exhaust gas inlet in a mixed gas state in the heat-absorbing chamber; and a reaction furnace that disposes the electrode apart from the internal wall, that forms a flame vent at an opposite side of the base to connect the flame vent to the base, that receives a mixed gas through a mixture gas nozzle that is connected to the mixture chamber, and that projects a flame that is generated in the mixed gas by a plasma discharge between the electrode and the internal wall to the flame vent.

A plurality of mixture gas nozzles may be formed to be disposed with equal distances therebetween along a circumferential direction in the reaction furnace and may be formed to be inclined by a preset angle in a central direction of a cylinder.

One of the exhaust gas inlets may be connected to a heat-absorbing chamber that is formed at the center of the electrode, and the fuel inflow conduit may be provided within the exhaust gas inlet to be connected to the heat-absorbing chamber.

The plasma burner may include an ejecting air inlet that injects air for ejecting fuel that is injected to the fuel inlet and at least one exhaust gas inlet that supplies exhaust gas to a mixed gas of the fuel and air, wherein the DPF may further include an ejecting air inflow conduit that is connected to the ejecting air inlet.

The plasma burner may include a base that includes a mixture chamber in which the fuel inlet, the ejecting air inlet, and the exhaust gas inlet are formed; an electrode that is mounted in the base with an insulator interposed therebetween, that has a heat-absorbing chamber at the inside thereof, and that mixes and heats fuel and air that are injected from the fuel inlet and the ejecting air inlet in a mixed gas state in the heat-absorbing chamber; and a reaction furnace that disposes the electrode apart from the internal wall, and that forms a flame vent at an opposite side of the base to connect the flame vent to the base, that receives a mixed gas through a mixture gas nozzle that is connected to the mixture chamber, and that projects a flame that is generated in the mixed gas by a plasma discharge between the electrode and the internal wall to the flame vent.

The ejecting air inflow conduit may be connected to a heat-absorbing chamber that is formed at the center of the electrode, the fuel inflow conduit may be provided within the ejecting air inflow conduit to be connected to the heat-absorbing chamber, and the exhaust gas inlet may be connected to the mixture chamber.

The plasma burner may include an ejecting air inlet that injects air for ejecting fuel that is injected to the fuel inlet and a discharge air inlet that supplies discharge air to a mixed gas of the fuel and air, wherein the DPF may further include an ejecting air inflow conduit that is connected to the ejecting air inlet, and a discharge air inflow conduit that is connected to the discharge air inlet.

The plasma burner may include a base that includes: a mixture chamber in which the fuel inlet, the ejecting air inlet, and the discharge air inlet are formed; an electrode that is mounted in the base with an insulator interposed therebetween, that has a heat-absorbing chamber at the inside thereof, and that mixes and heats fuel and air that are injected from the fuel inlet and the ejecting air inlet in a mixed gas state in the heat-absorbing chamber; and a reaction furnace that disposes the electrode apart from the internal wall, that forms a flame vent at an opposite side of the base to connect the flame vent to the base, that receives a mixed gas through a mixture gas nozzle that is connected to the mixture chamber, and that projects a flame that is generated in the mixed gas by a plasma discharge between the electrode and the internal wall to the flame vent.

The ejecting air inflow conduit may be connected to a heat-absorbing chamber that is formed at the center of the electrode, the fuel inflow conduit may be provided within the ejecting air inflow conduit to be connected to the heat-absorbing chamber; and the discharge air flow conduit may be connected to the mixture chamber.

The plasma burner may include an ejecting air inlet that injects air for ejecting fuel that is injected to the fuel inlet, a discharge air inlet that supplies discharge air to a mixed gas of the fuel and air, and at least one exhaust gas inlet that supplies exhaust gas to the mixed gas and the discharge air, wherein the DPF may further include an ejecting air inflow conduit that is connected to the ejecting air inlet and a discharge air inflow conduit that is connected to the discharge air inlet.

The plasma burner may include: a base that includes a mixture chamber in which the fuel inlet, the ejecting air inlet, the discharge air inlet, and the exhaust gas inlet are formed; an electrode that is mounted in the base with an insulator interposed therebetween, that has a heat-absorbing chamber at the inside thereof, and that mixes and heats fuel and air that are injected from the fuel inlet and the discharge air inlet in a mixed gas state in the heat-absorbing chamber; and a reaction furnace that disposes the electrode apart from the internal wall, that forms a flame vent at an opposite side of the base to connect the flame vent to the base, that receives a mixed gas through a mixture gas nozzle that is connected to the mixture chamber, and that ejects a flame that is generated in the mixed gas by a plasma discharge between the electrode and the internal wall to the flame vent.

The ejecting air inflow conduit may be connected to a heat-absorbing chamber that is formed at the center of the electrode, the fuel inflow conduit may be provided within the ejecting air inflow conduit to be connected to the heat-absorbing chamber, and the discharge air inflow conduit and the exhaust gas inlet may be connected to the mixture chamber.

The plasma burner may include a reaction furnace that is provided within the exhaust conduit, and an electrode that is provided within the reaction furnace while sustaining a distance from an internal surface of the reaction furnace.

The reaction furnace may include: a preheating passage that is connected to the fuel inflow conduit to preheat the supplied fuel; a fuel inlet that supplies the preheated fuel to a space between the reaction furnace and the electrode; an exhaust gas inlet that mixes fuel that is injected into the reaction furnace through the fuel inlet with exhaust gas, and that is formed in one side of the reaction furnace in order to induce the formed mixed gas between the reaction furnace and the electrode to supply the exhaust gas; and a flame vent that is formed at the other side of the reaction furnace to project a flame by a plasma discharge of the mixing gas.

The reaction furnace may include an external cylinder that is exposed within the exhaust conduit, and an internal cylinder that is provided within the external cylinder to form a preheating passage between the internal cylinder and the external cylinder, wherein, at the exhaust gas inlet side, the internal cylinder may form an inner surface of a cone that is progressively opened toward the exhaust gas inlet side.

The fuel inlet may be formed at the inside of the cone to connect the preheating passage between the reaction furnace and the electrode.

The preheating passage may be formed in a spiral structure advancing toward the exhaust gas inlet side at the flame vent side.

The plasma burner may further include a guide member that is disposed at the exhaust gas inlet side and that is formed with a greater diameter than that of the exhaust gas inlet to induce the exhaust gas to the exhaust gas inlet.

The guide member may include a plurality of veins that are provided at the inside thereof in order to induce a swirl flow between the reaction furnace and the electrode.

The plasma burner may further include a heat exchanger that is provided in the fuel inflow conduit.

Meanwhile, the plasma burner may comprises: a base that includes a discharge air inlet that supplies discharge air are formed; an electrode that is mounted in the base with an insulator interposed therebetween; and a reaction furnace that disposes the electrode apart from the internal wall, that forms a flame vent at an opposite side of the base to connect the flame vent to the base, that projects a flame that is generated by a plasma discharge between the electrode and the internal wall to the flame vent. The fuel inlet is formed on the side of the reaction furnace, and the fuel inflow conduit connects the inner space of the reaction furnace and the fuel tank through the fuel inlet.

As described above, according to the present invention, by preheating fuel, mixing the fuel with an exhaust gas, and generating a flame by a plasma discharge, PMs within an exhaust gas can be effectively oxidized and removed.

Further, by providing a plasma burner within an exhaust conduit, space around an exhaust conduit can be used to the maximum.

A flow disturbance member can stabilize a flame by disturbing a flow of an exhaust gas around a flame vent of a reaction furnace.

A fuel ejecting nozzle ejects a frame to the front of the flame to further enlarge the flame, thereby further effectively oxidizing and removing PMs.

Further, by mixing and preheating fuel and ejecting air, mixing a mixed gas with an exhaust gas, and generating a flame by a plasma discharge, PMs within the exhaust gas can be effectively oxidized and removed.

Further, by mixing and preheating fuel, air, and discharge air, mixing a mixed gas with an exhaust gas, and generating a flame by a plasma discharge, PMs within the exhaust gas can be effectively oxidized and removed.

According to an exemplary embodiment of the present invention, by inducing a mixed gas in which fuel that is preheated while passing through a reaction furnace and an exhaust gas that is injected to an exhaust gas inlet are mixed to space between a reaction furnace and an electrode, and ejecting a flame that is generated with a flow of the mixed gas and a plasma discharge that is generated between the reaction furnace and the electrode to a flame vent, a preheating structure of fuel can be simplified and PMs within the exhaust gas can be effectively oxidized.

Further, according to an exemplary embodiment of the present invention, by disposing an electrode at an inside of a reaction furnace and supplying fuel and an exhaust gas to space between an outer surface of the electrode and an inner surface of the reaction furnace, and by causing a plasma discharge between the outer surface of the electrode and the inner surface of the reaction furnace, a structure for mixing fuel and an exhaust gas can be simplified.

Further, according to an exemplary embodiment of the present invention, because supply of fresh air is unnecessary, an air compressor is unnecessary, so that a price of the device can be lowered and an operation condition of the device can be simplified.

DETAILED DESCRIPTION OF THE EMBODIMENTS

Figure 1:
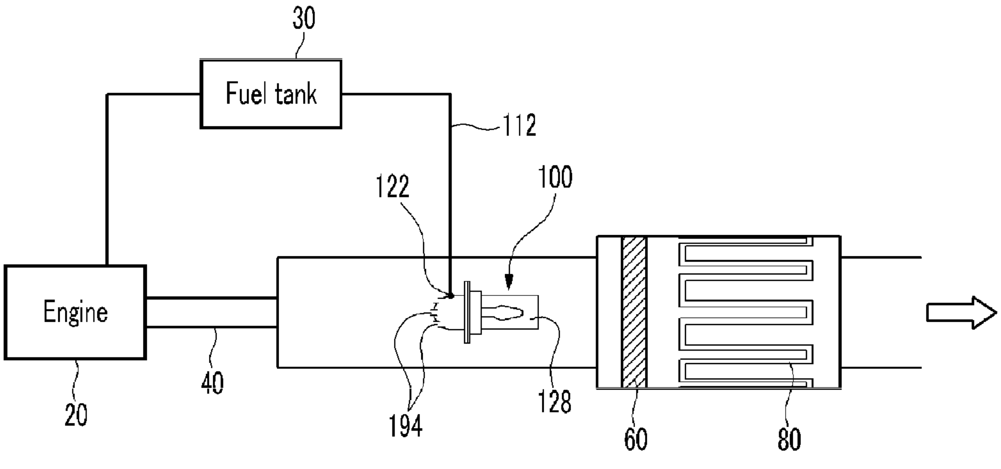
FIG. 1 is a block diagram of a DPF according to a first exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

FIG. 1 is a block diagram of a DPF according to a first exemplary embodiment of the present invention. Referring to FIG. 1, the DPF is a device that traps and oxidizes PMs that are included in exhaust gas that is discharged through an exhaust conduit 40 that is connected to an engine 20.

The DPF includes an oxidation catalyst 60 for primarily oxidizing PMs, a filter 80 that traps the remaining PMs that pass through the oxidation catalyst 60, and a plasma burner 100 that promotes oxidation of PMs that are trapped in the filter 80.

The oxidation catalyst 60 is provided at the front of the filter 80 within the exhaust conduit 40 to primarily oxidize PMs that are included in exhaust gas that passes through the exhaust conduit 40, and when the temperature of the exhaust gas is lower than that of an oxidization condition, if exhaust gas of a low temperature is heated through the plasma burner 100, the oxidation catalyst 60 additionally oxidizes PMs that are trapped in the filter 80.

The filter 80 is connected to the exhaust conduit 40 at a side opposite to that of the engine 20 to trap PMs that are included in exhaust gas while exhaust gas that passes through the exhaust conduit 40 moves therethrough. The filter 80 is disposed at the rear side of the oxidation catalyst 60 to trap PMs that are included in exhaust gas that is primarily oxidized by the oxidation catalyst 60.

The plasma burner 100 injects fuel at an inside thereof, reforms the fuel to a pre-oxidation material, of which is hydrogen and carbon monoxide are main components, and a flame therein burns the fuel to thereby heat the exhaust gas.

As an example, the DPF includes a fuel inflow conduit 112 that supplies fuel to exhaust gas in the plasma burner 100.

The plasma burner 100 is provided within the exhaust conduit 40 between the engine 20 and the filter 80. The plasma burner 100 includes a fuel inlet 122, an exhaust gas inlet 194, and a flame vent 128 to be applied to the DPF.

The fuel that is injected into the plasma burner 100 flows through the fuel inflow conduit 112 that connects the fuel inlet 122 and the fuel tank 30. Exhaust gas that enters the exhaust gas inlet 194 causes fuel in the fuel inflow conduit 112 to flow through the fuel inlet 122 into the plasma burner 100.

Further, the fuel inflow conduit 112 and the fuel inlet 122 that supply fuel into the plasma burner 100 may be replaced with an injector (not shown) that directly injects fuel to an electrode 150.

The exhaust gas inlet 194 allows exhaust gas within the exhaust conduit 40 to flow into the plasma burner 100. Exhaust gas that flows through the exhaust gas inlet 194 is mixed with fuel and thus a mixed gas is formed, and a flame that is generated by a plasma discharge in the mixed gas is formed in the flame vent 128.

Figure 2:
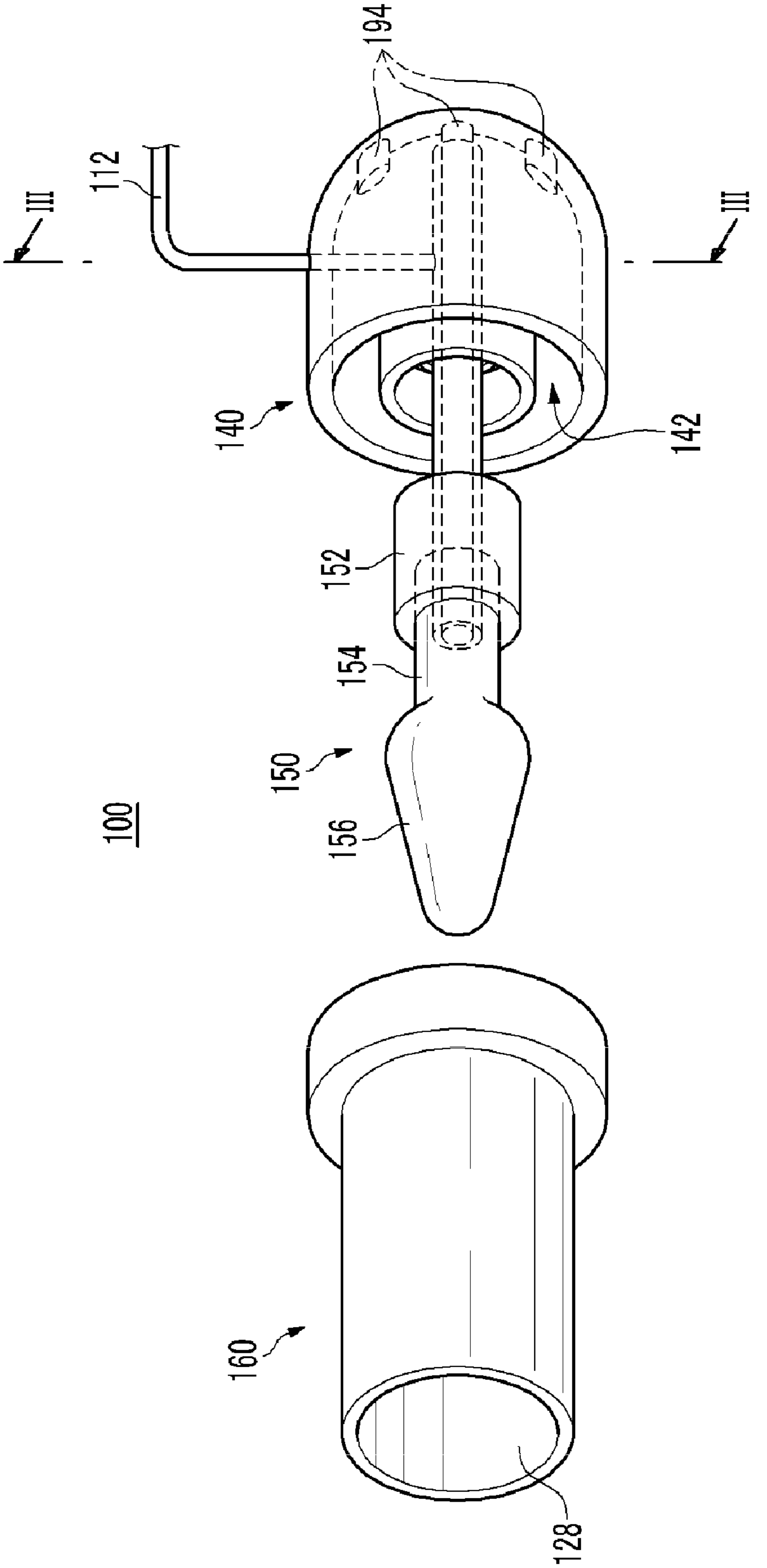
FIG. 2 is an exploded perspective view of a plasma burner that is shown in FIG. 1 according to the first exemplary embodiment of the present invention.
Figure 3:
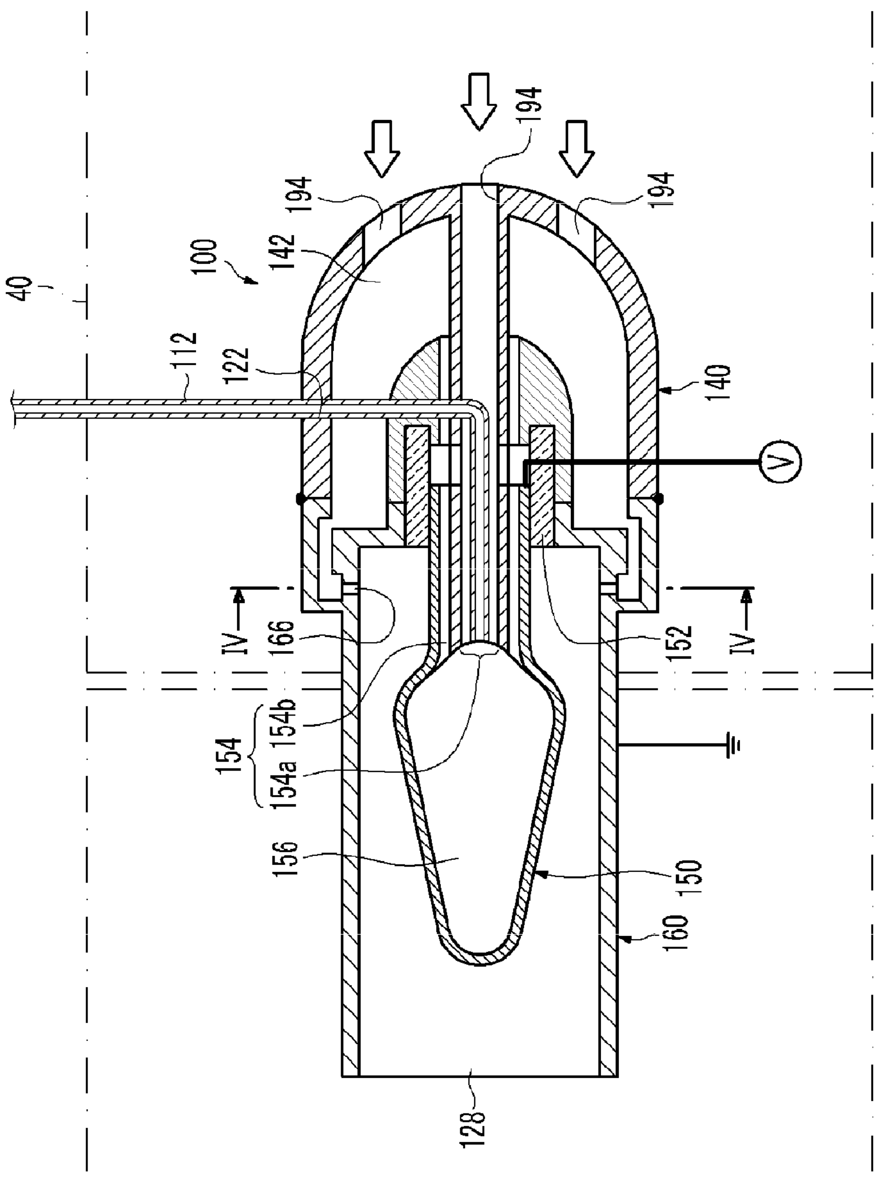
FIG. 3 is a cross-sectional view of the plasma burner taken along line III-III of FIG. 2.

FIG. 2 is an exploded perspective view of a plasma burner that is shown in FIG. 1 according to the first exemplary embodiment of the present invention, and FIG. 3 is a cross-sectional view of the plasma burner taken along line III-III of FIG. 2.

Referring to FIGS. 2 and 3, the plasma burner 100 includes a base 140, the electrode 150, and a reaction furnace 160.

In the base 140, the fuel inlet 122 and at least one exhaust gas inlet 194 are formed, and the base 140 includes a mixture chamber 142 that is formed at the inside thereof. Because the plasma burner 100 is provided within the base 140, in order to minimize prevention of flow of the exhaust gas, the plasma burner 100 is formed in a structure that minimizes resistance to exhaust gas flow.

For example, the base 140 has a curved surface shape that is convex toward the engine 20 side (the opposite side to that of the electrode). Exhaust gas that flows from the engine 20 side to the filter 80 side may be guided to the filter 80 while receiving minimum resistance by the convex curved surface of the base 140.

The electrode 150 includes a mounting unit 154 that is mounted in the base 140 with an insulator 152 interposed therebetween, and a heat-absorbing chamber 156 that is extended to the mounting unit 154 is formed at the inside thereof.

Fuel and exhaust gas from the fuel inlet 122 and the exhaust gas inlet 194 of the base 140, respectively, enter the heat-absorbing chamber 156 to be mixed in a mixed gas state and to be heated. The insulator 152 electrically insulates the electrode 150 from the base 140 or the reaction furnace 160.

The electrode 150 has a shape that is extended to a side opposite that of the base 140 of the mounting unit 154 to form a maximum extension portion and that then becomes gradually narrow. That is, the heat-absorbing chamber 156 is formed in an approximate conical shape.

The mounting unit 154 forms a double passage by a double pipe and include a first passage 154*a* that is formed at the inside thereof and a second passage 154*b* that is formed at the outside of the first passage 154*a*. The exhaust gas inlet 194 is connected to the first passage 154*a*. The heat-absorbing chamber 156 and the mixture chamber 142 are connected to the second passage 154*b*.

The exhaust gas inlet 194 is connected to the heat-absorbing chamber 156 that is formed at the center of the electrode 150 through the first passage 154*a*. The fuel inflow conduit 112 is connected to the heat-absorbing chamber 156 through the inside of the exhaust gas inlet 194.

Fuel that is supplied to the fuel inflow conduit 112 is supplied to one side of the heat-absorbing chamber 156 and is ejected in a mixed gas state into the heat-absorbing chamber 156 by an exhaust gas that is supplied to the exhaust gas inlet 194 at the end of the fuel inflow conduit 112.

A mixed gas that is heated in the heat-absorbing chamber 156 is supplied to the mixture chamber 142 that is formed in the base 140 through the second passage 154*b*.

The exhaust gas inlet 194 is connected to the mixture chamber 142. Exhaust gas that is supplied to the exhaust gas inlet 194 ejects a mixed gas within the mixture chamber 142 into the reaction furnace 160 through a mixture gas nozzle 166.

The reaction furnace 160 has the electrode 150, is connected to the base 140, and forms the flame vent 128 at an opposite side of the base 140. An inner wall of the reaction furnace 160 sustains a state apart from the electrode 150.

As the reaction furnace 160 is formed in a cylinder shape and the electrode 150 has a shape that becomes gradually narrow, a distance between the inner wall of the reaction furnace 160 and the electrode 150 gradually increases. That is, a distance from the heat-absorbing chamber 156 side to an outer surface of the electrode 150 and the inner wall of the reaction furnace 160 is shortest in a maximum extension portion, and as the electrode 150 becomes narrow, a distance thereof gradually increases.

For example, the reaction furnace 160 and the base 140 are disposed in a straight line along a length direction of the exhaust conduit 40, and opposite outer edges thereof are connected to each other using welding or bolting in a state where the electrode 150 is provided.

The reaction furnace 160 is connected to the mixture chamber 142 that is formed in the base 140 through the mixture gas nozzle 166 that is provided at the side thereof to receive a mixed gas from the mixture chamber 142.

Because a preset voltage V is applied to the electrode 150 and the reaction furnace 160 is grounded, a plasma discharge is generated between the electrode 150 and the inner wall of the reaction furnace 160. That is, due to a gradual change of a distance between an outer surface of the electrode 150 and the inner wall of the reaction furnace 160, a plasma discharge that is generated between them is extended along an extended distance.

A plasma discharge that is generated between the electrode 150 and the reaction furnace 160 is repeatedly generated at a portion at which the distance between the electrode 150 and the reaction furnace 160 is narrow, and is extinguished after being diffused to a portion at which a distance thereof is wide, and is generated again at a portion at which the distance thereof is narrow, and is extinguished after again being diffused at a portion at which the distance thereof is wide.

The plasma discharge that is generated in the mixed gas of fuel and exhaust gas facilitates oxidation in the oxidation catalyst 60 by burning the mixed gas or reforming a part of the mixed gas to a pre-oxidation material including hydrogen and carbon monoxide.

Figure 4:
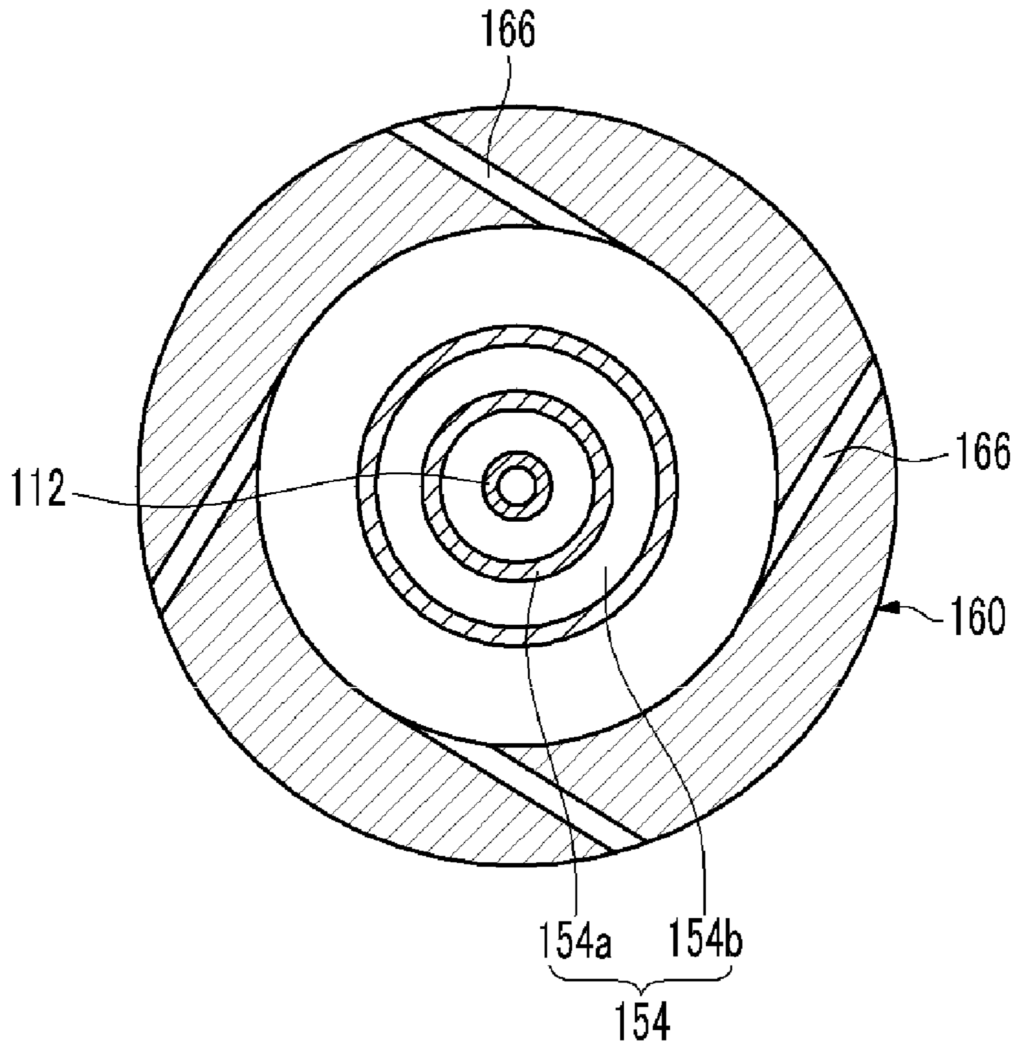
FIG. 4 is a cross-sectional view of the plasma burner taken along line IV-IV of FIG. 3.

FIG. 4 is a cross-sectional view of the plasma burner taken along line IV-IV of FIG. 3.

Referring to FIG. 4, a plurality of mixture gas nozzles 166 are formed and disposed at equal intervals along a circumferential direction in the reaction furnace 160, and are formed to be inclined by a preset angle in a central direction of a cylinder.

A mixed gas that is injected from the mixture chamber 142 to the reaction furnace 160 through the mixture gas nozzle 166 forms a swirl pattern within the reaction furnace 160 according to guidance of the mixture gas nozzles 166.

The plurality of mixture gas nozzles 166 that are disposed at equal intervals generate a uniform swirl pattern along a circumferential direction within the reaction furnace 160, thereby efficiently using internal space of the reaction furnace 160.

A plasma discharge that is generated between the electrode 150 and the reaction furnace 160 generates a flame to the swirl pattern of the mixed gas that is guided through the mixture gas nozzle 166, and the flame is projected from the reaction furnace 160 to the exhaust conduit 40 through the flame vent 128. The flame forms an advantageous condition for oxidizing PMs that are trapped on the filter 80 by heating the exhaust gas.

Exemplary embodiments that are described hereinafter are formed by adding additional elements to the configuration of the first exemplary embodiment, and descriptions of portions similar to or to the same as those of the first exemplary embodiment are omitted and portions that are different from those of the first exemplary embodiment will be described.

Figure 5:
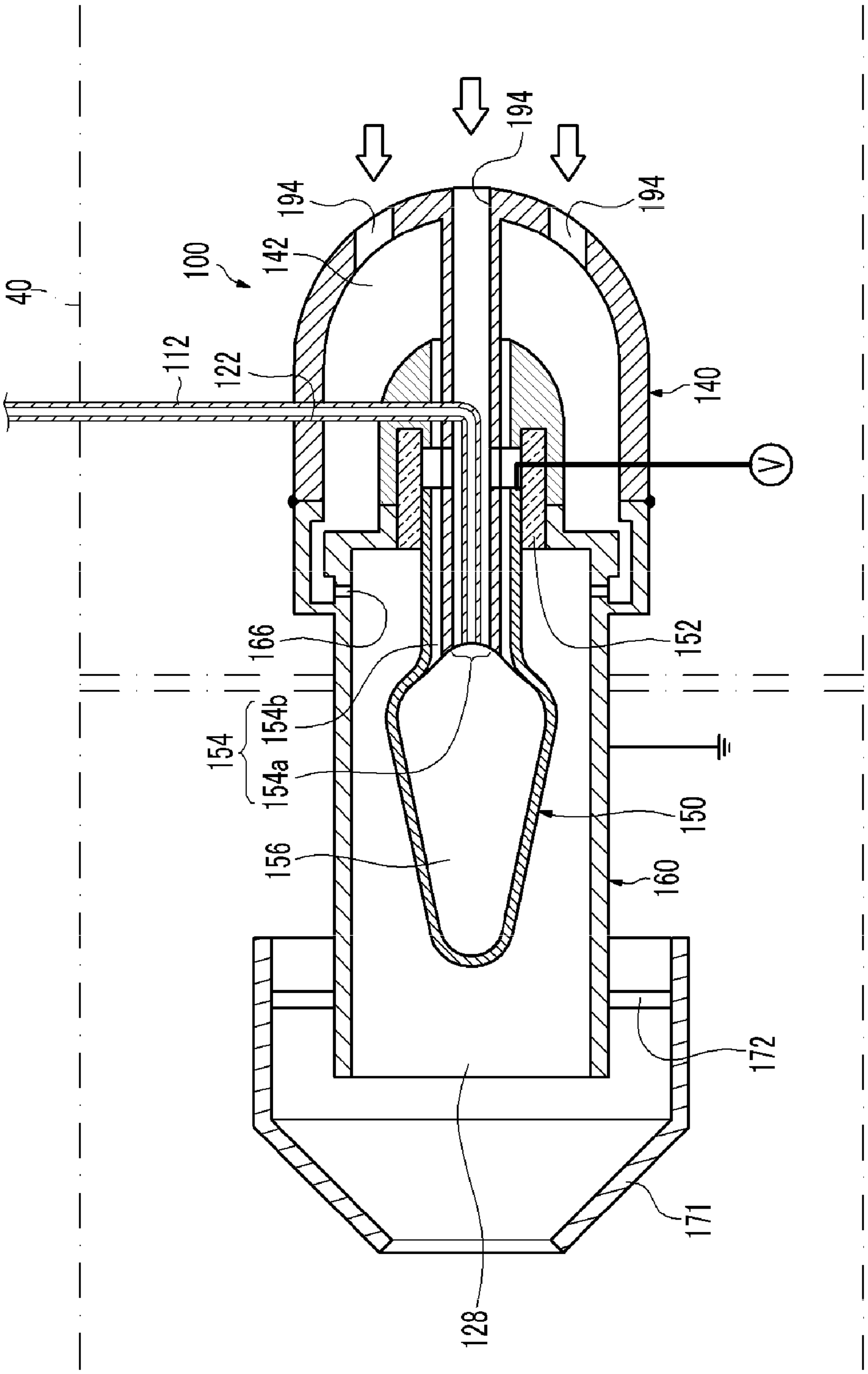
FIG. 5 is a cross-sectional view of a plasma burner according to a second exemplary embodiment of the present invention.

FIG. 5 is a cross-sectional view of a plasma burner according to a second exemplary embodiment of the present invention.

Referring to FIG. 5, the plasma burner 100 further includes a cowl 171. The cowl 171 is disposed at the front of the reaction furnace 160 to guide the flame that is projected from the flame vent 128 and to prevent instability of the flame due to abrupt contact between the projected flame and exhaust gas at the outside of the reaction furnace 160. The cowl 171 may be provided in an outer wall of the reaction furnace 160 through a connection member 172.

Figure 6:
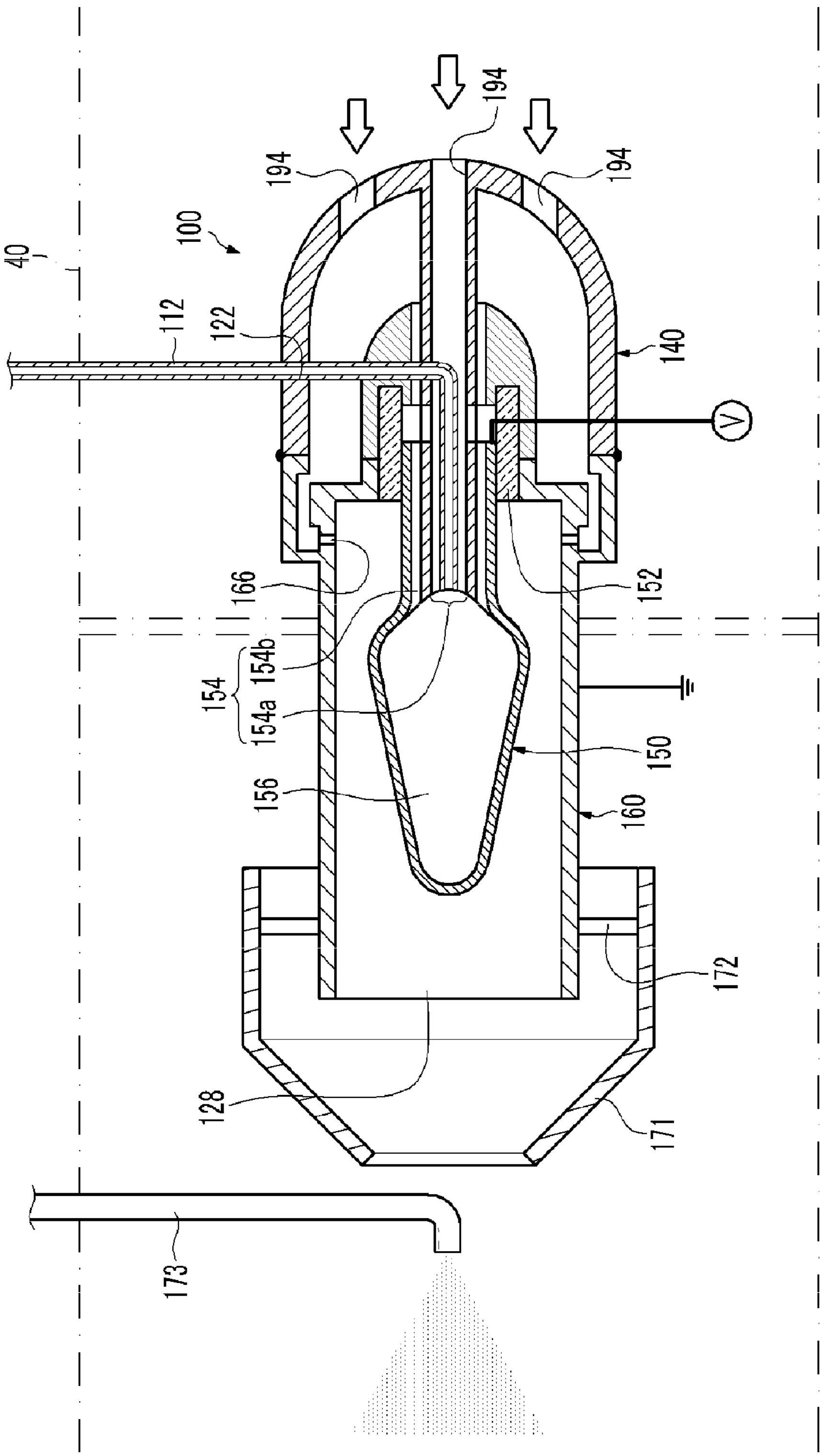
FIG. 6 is a cross-sectional view of a plasma burner according to a third exemplary embodiment of the present invention.

FIG. 6 is a cross-sectional view of a plasma burner according to a third exemplary embodiment of the present invention.

Referring to FIG. 6, the plasma burner 100 further includes a fuel ejecting nozzle 173 at the front of the cowl 171. The fuel ejecting nozzle 173 is connected to the fuel tank 30 to receive fuel, and is disposed at the front of the cowl 171 to eject fuel into a flame that is guided through the cowl 171.

Fuel that is ejected into the flame is evaporated by heat of the flame, and the exhaust gas is additionally heated while a considerable amount thereof is burned.

Figure 7:
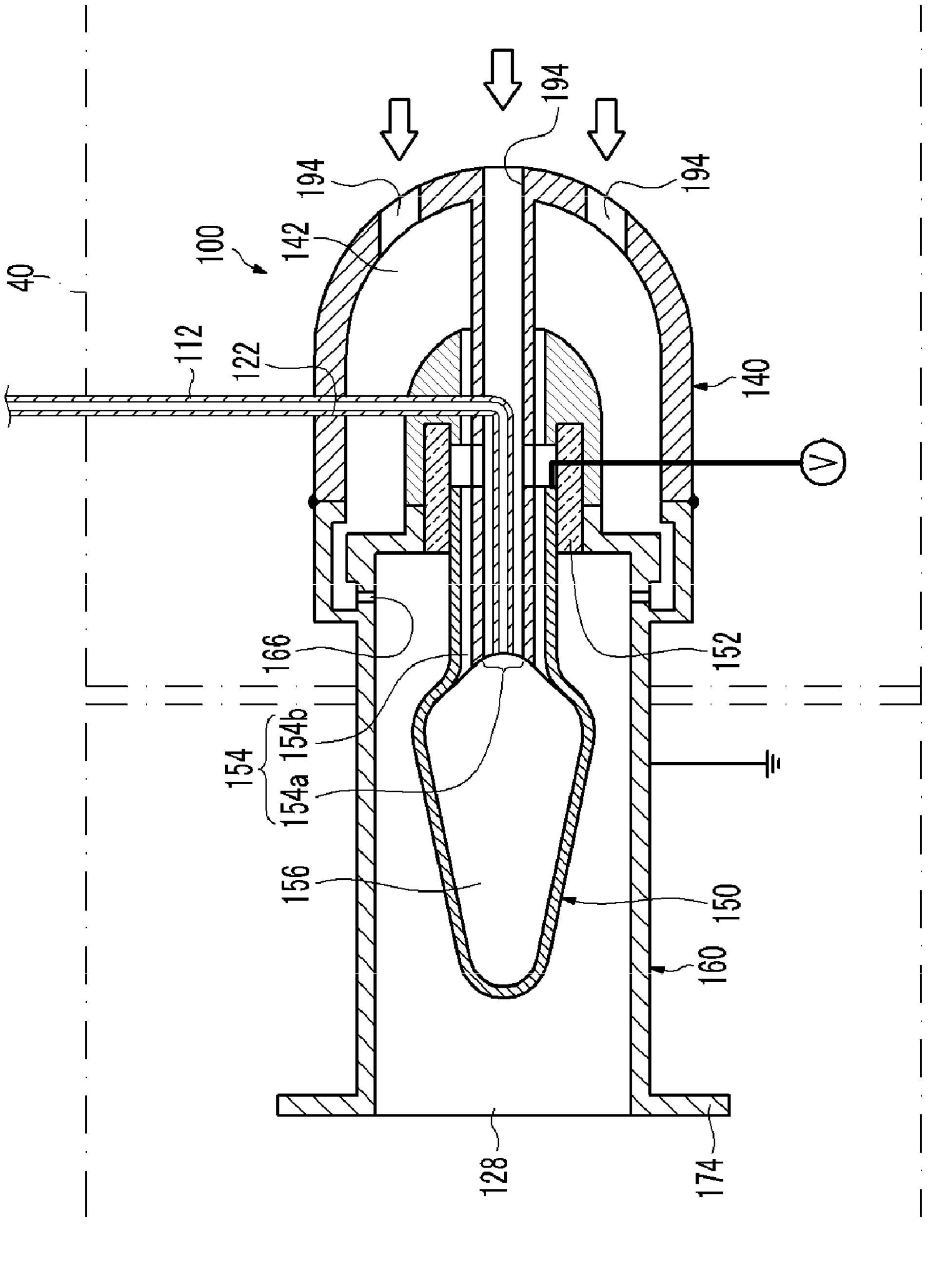
FIG. 7 is a cross-sectional view of a plasma burner according to a fourth exemplary embodiment of the present invention.
Figure 9:
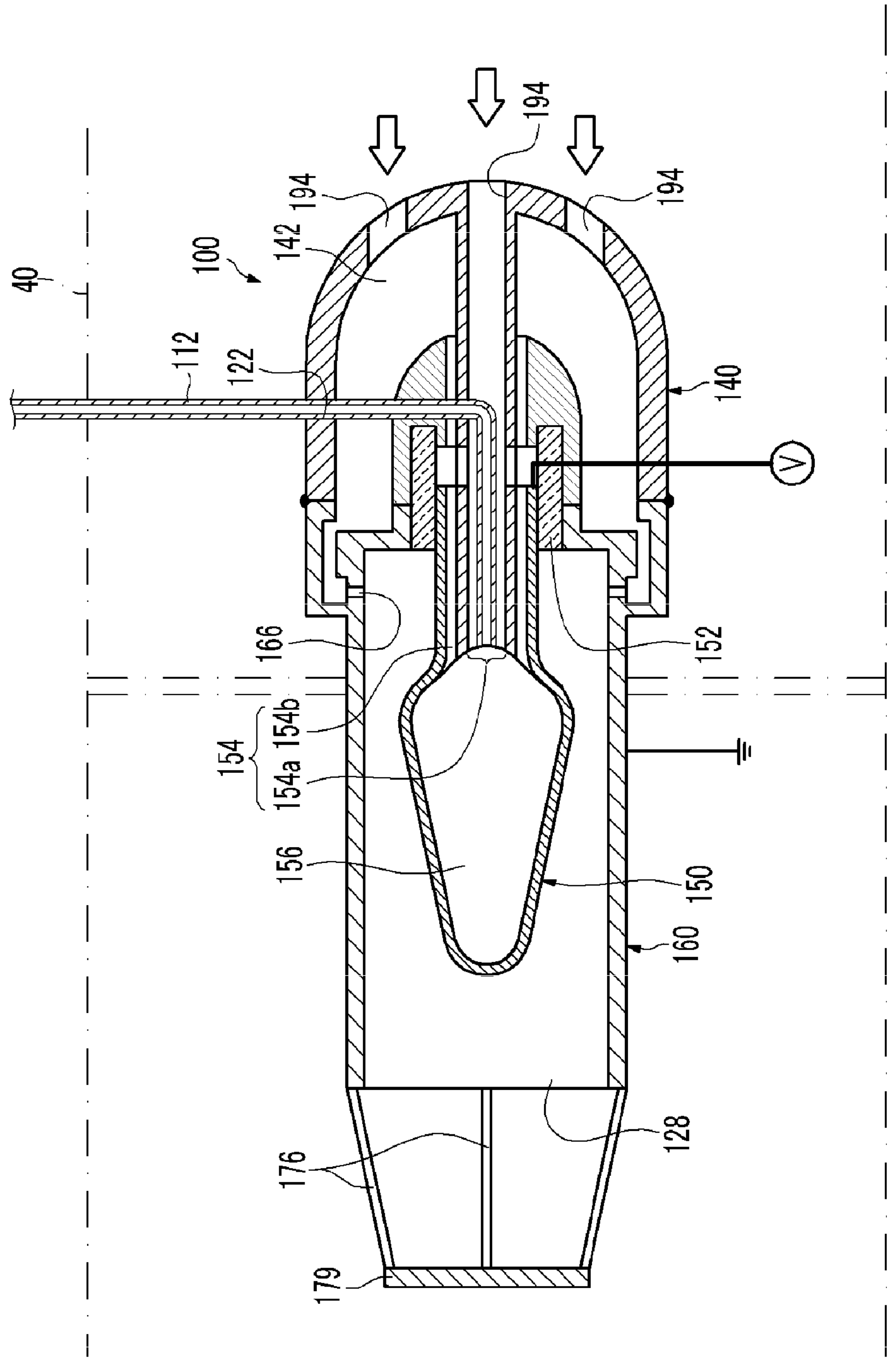
FIG. 9 is a cross-sectional view of a plasma burner according to a sixth exemplary embodiment of the present invention.

FIGS. 7 and 9 are cross-sectional views of plasma burners according to a fourth exemplary embodiment to a sixth exemplary embodiment of the present invention.

Figure 8:
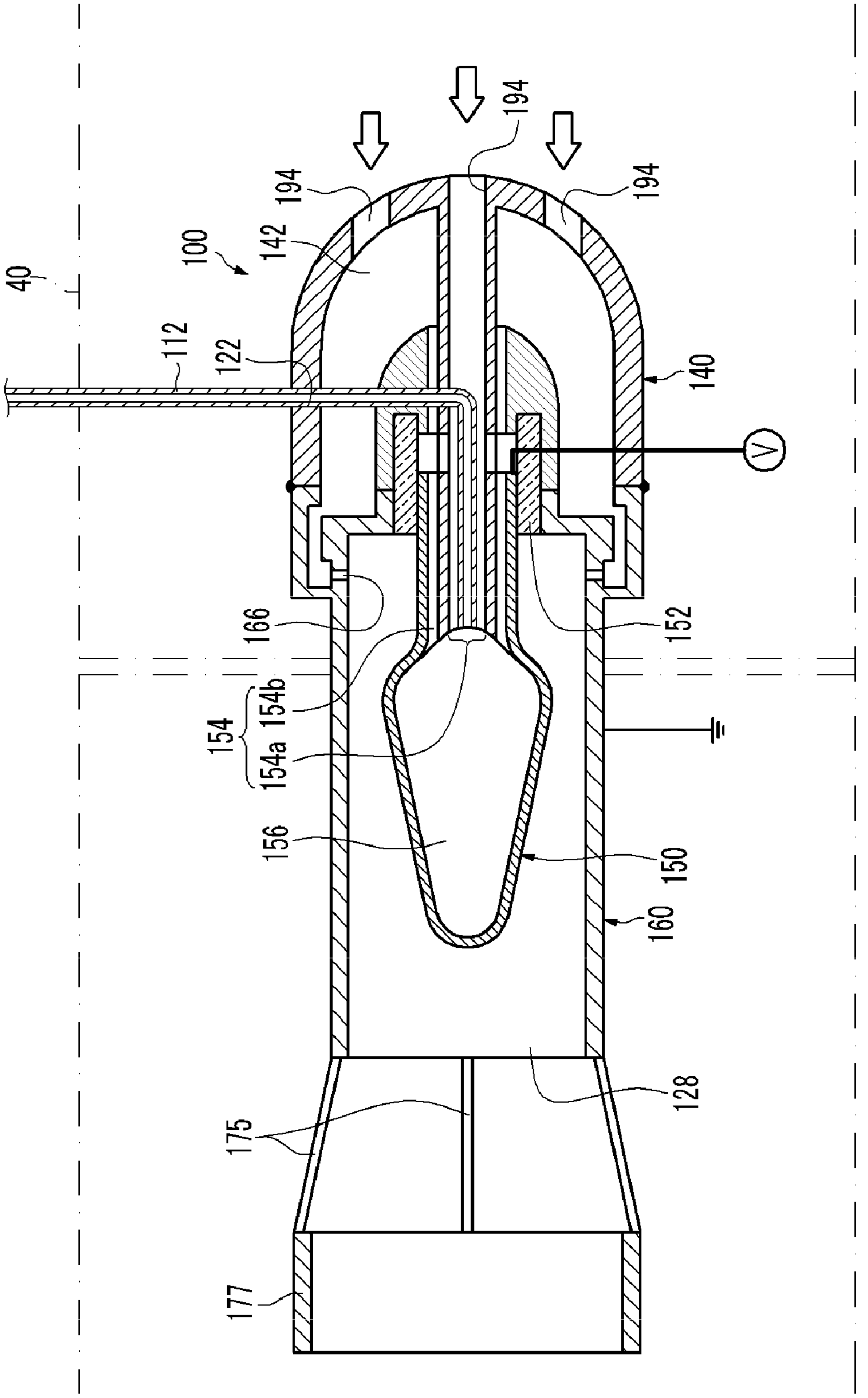
FIG. 8 is a cross-sectional view of a plasma burner according to a fifth exemplary embodiment of the present invention.

Referring to FIGS. 7 to 9, the plasma burner 100 further includes flow disturbance members 174, 177, and 179 around the flame vent 128 of the reaction furnace 160. The flow disturbance members 174, 177, and 179 may be differently formed, as shown in FIGS. 7 to 9.

Referring to FIG. 7, the flow disturbance member 174 is formed to protrude from an external circumference of the reaction furnace 160 at the flame vent 128. The flow disturbance member 174 gathers and stabilizes a flame that is projected to the flame vent 128 by flowing an exhaust gas between an external circumferential surface of the reaction furnace 160 and the exhaust conduit 40.

Referring to FIG. 8, the flow disturbance member 177 is disposed apart from the front of the flame vent 128. The flow disturbance member 177 may be formed in a circular strip having an interior diameter greater than that of the flame vent 128. The flow disturbance member 177 may be provided at the front of the reaction furnace 160 through the connection member 175. The flow disturbance member 177 again gathers and stabilizes a flame that is diffused after being projected from the flame vent 128 and advancing by a predetermined distance, and allows fuel that is not burned to additionally burn using oxygen among the exhaust gas.

Referring to FIG. 9, the flow disturbance member 179 is disposed to correspond to the center of the flame vent 128 at the front of the flame vent 128. The flow disturbance member 179 is formed as a circular plate to be provided at the front of the reaction furnace 160 through the connection member 176.

The flow disturbance member 179 of FIG. 9 provides a contact surface for non-burned fuel droplets and protrudes from the reaction furnace 160 to evaporate and burn the fuel droplets and to prevent instability of a flame due to abrupt mixing of the flame and exhaust gas.

Figure 10:
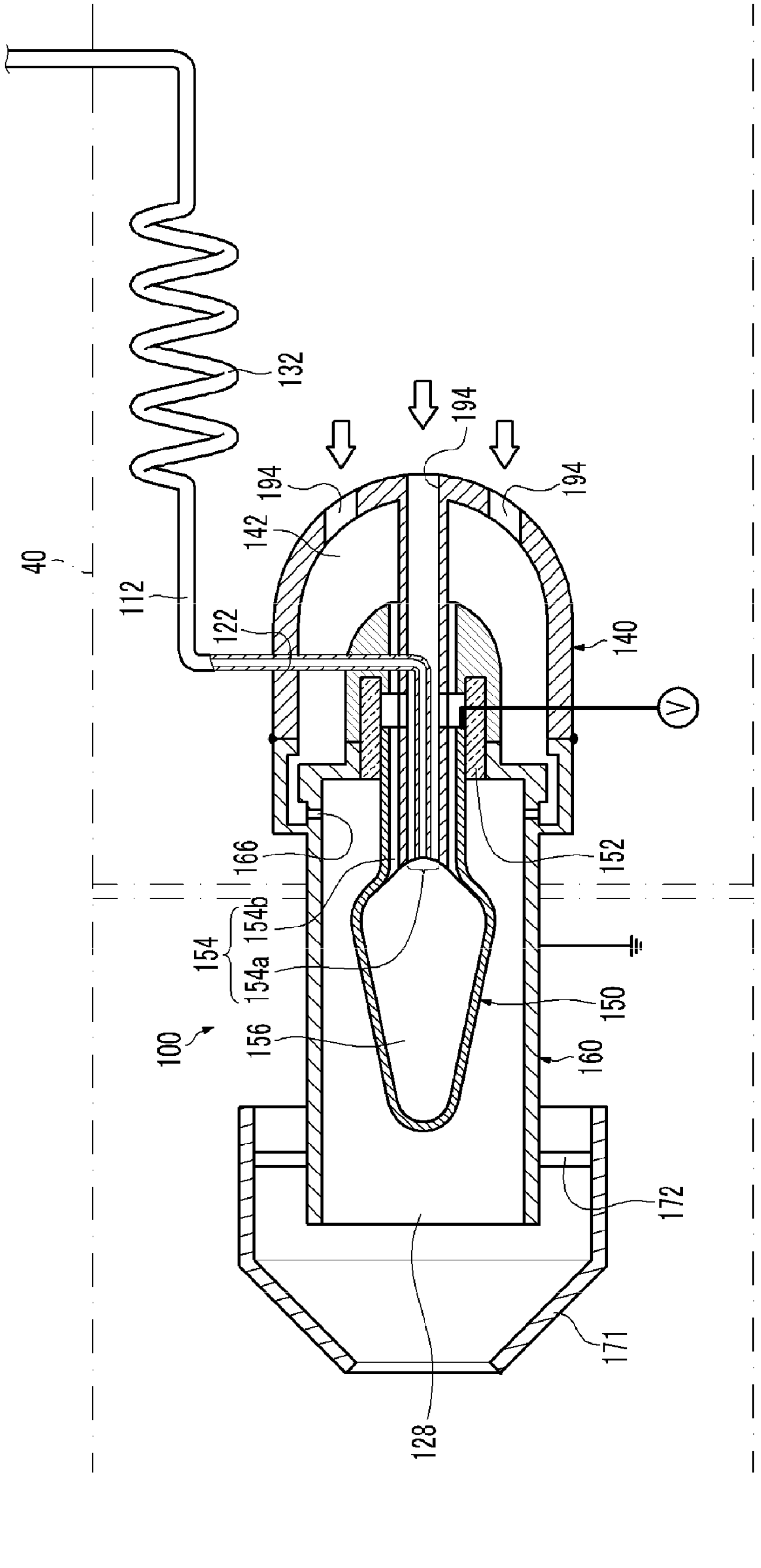
FIG. 10 is a cross-sectional view of a plasma burner according to a seventh exemplary embodiment of the present invention.

FIG. 10 is a cross-sectional view of a plasma burner according to a seventh exemplary embodiment of the present invention.

Referring to FIG. 10, the fuel inflow conduit 112 includes a heat exchanger 132.

As an example, the heat exchanger 132 of the fuel inflow conduit 112 is formed in a coil shape to increase a heat-absorbing area within the exhaust conduit 40, thereby heating fuel that is supplied through the fuel inflow conduit 112.

Further, the seventh exemplary embodiment illustrates a case where heat exchangers 132, 134, and 136 are provided to the second exemplary embodiment, and the case can be equally applied to the first exemplary embodiment, the third exemplary embodiment to the sixth exemplary embodiment, and the eighth exemplary embodiment.

Figure 11:
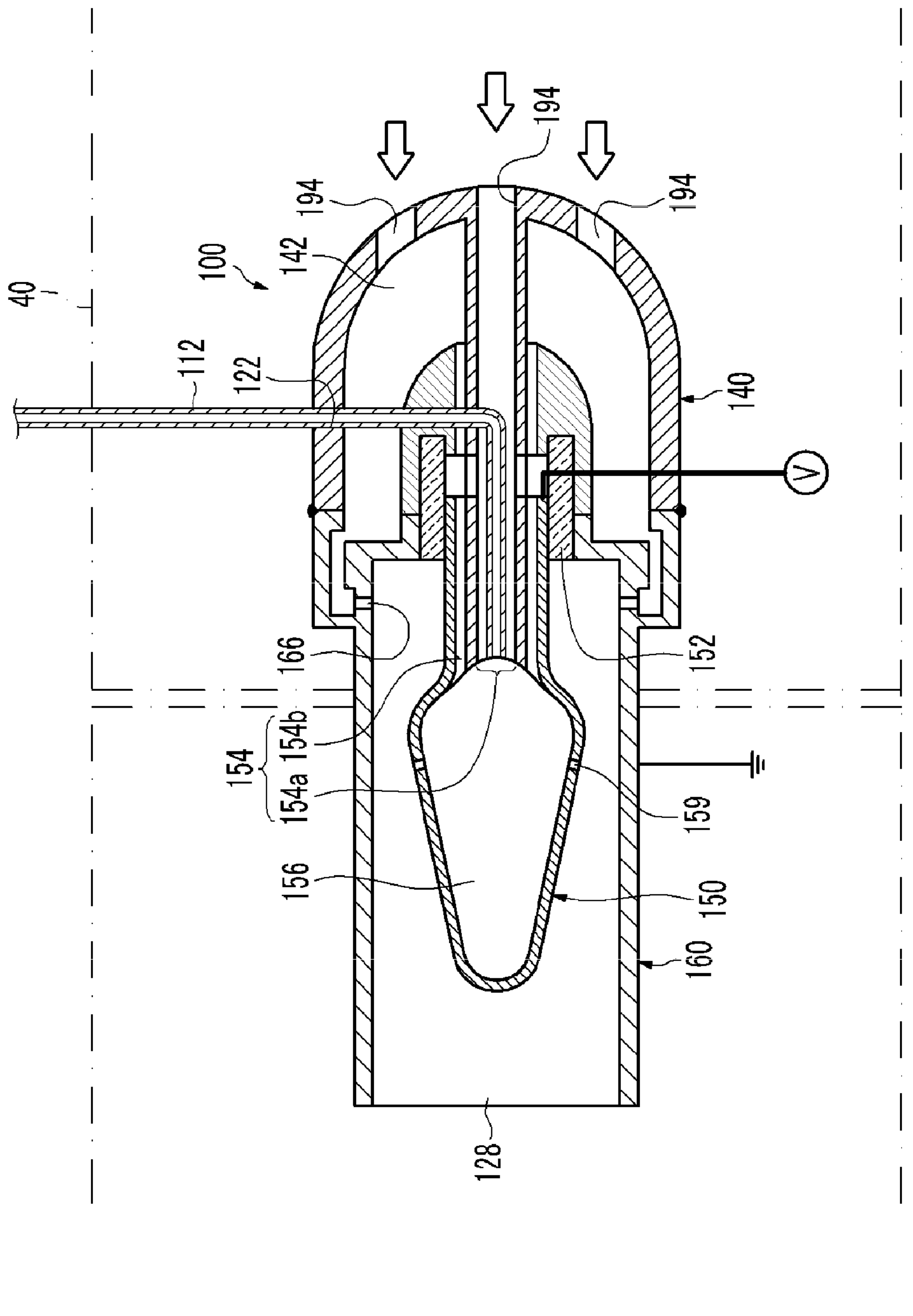
FIG. 11 is a cross-sectional view of a plasma burner according to an eighth exemplary embodiment of the present invention.

FIG. 11 is a cross-sectional view of a plasma burner according to an eighth exemplary embodiment of the present invention.

Referring to FIG. 11, the electrode 150 includes a penetrating third passage 159 that is formed. The third passage 159 directly connects a heat-absorbing chamber 156 to the inside of a reaction furnace 160. That is, while most of the mixed gas passes through the second passage 154*b*, the mixture chamber 142, and the mixture gas nozzle 166, the third passage 159 directly passes a part of the mixed gas from the heat-absorbing chamber 156 to the reaction furnace 160. Therefore, the third passage 159 can supply a large amount of fuel through the fuel supply conduit 112.

Further, the eighth exemplary embodiment illustrates a case in which the third passage 159 is formed in the first exemplary embodiment, and the case can be equally applied to the second exemplary embodiment to the seventh exemplary embodiment.

Figure 12:
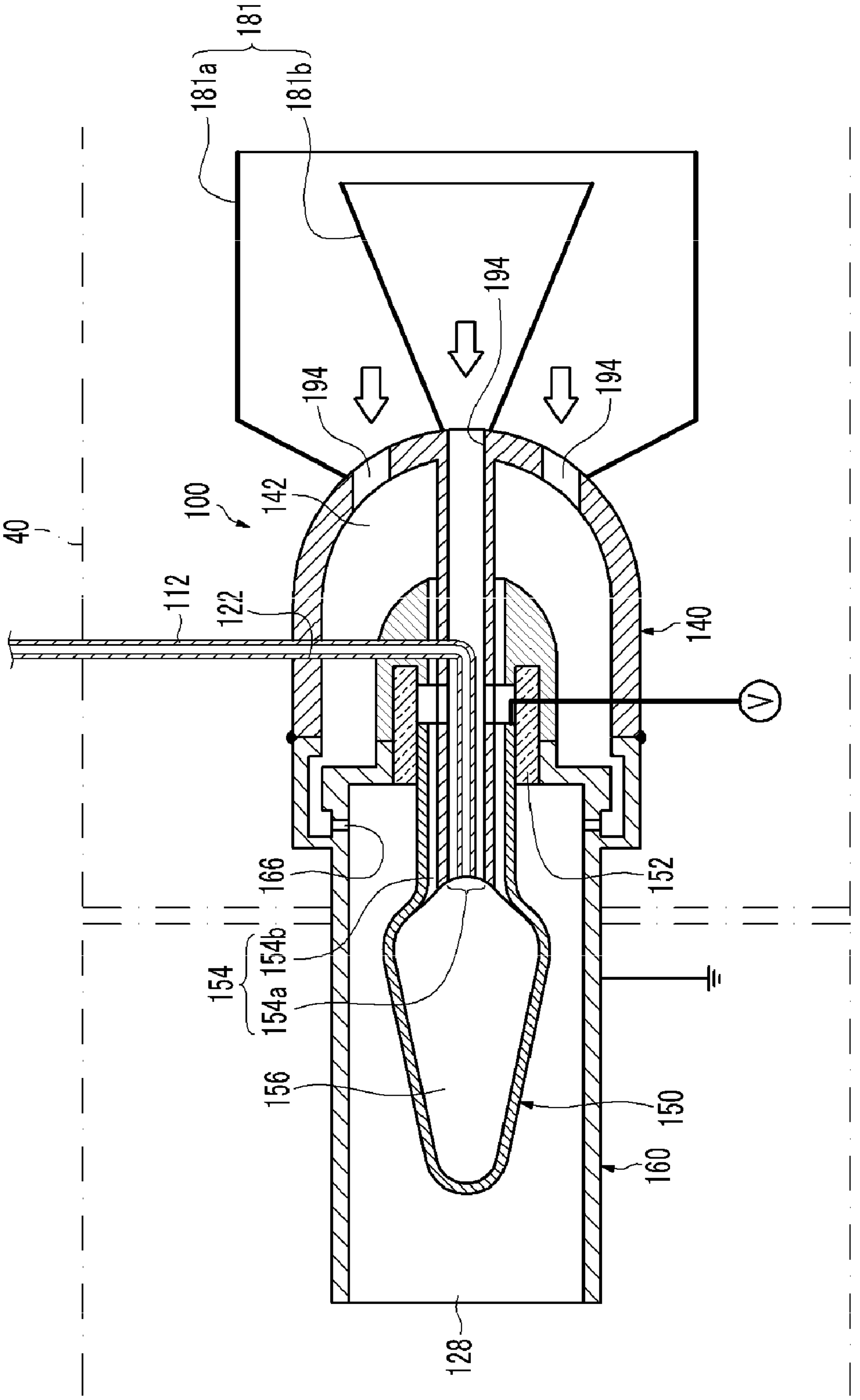
FIG. 12 is a cross-sectional view of a plasma burner according to a ninth exemplary embodiment of the present invention.

FIG. 12 is a cross-sectional view of a plasma burner according to a ninth exemplary embodiment of the present invention.

Referring to FIG. 12, an exhaust gas guide 181 is formed around exhaust gas inlets 194. The exhaust gas guide 181 guides exhaust gas to the exhaust gas inlet 194 through an opening having a wider area than a distribution area of the exhaust gas inlets 194 that are distributed in the base 140 and a shape that becomes gradually narrow from the opening.

The exhaust gas guide 181 includes a first exhaust gas guide 181*a* and a second exhaust gas guide 181*b* according to the corresponding exhaust gas inlets 194. The first exhaust gas guide 181*a* is formed around the exhaust gas inlet 194 to induce an exhaust gas flow toward the exhaust gas inlet 194 that is connected to the mixture chamber 142.

The second exhaust gas guide 181*b* is formed around the exhaust gas inlet 194 at the inside of the first exhaust gas guide 181*a* in order to induce an exhaust gas flow toward the exhaust gas inlet 194 that is connected to the heat-absorbing chamber 156.

Exhaust gas that is guided through the first exhaust gas guide 181*a* can accelerate the flow of a mixed gas that passes through the mixture chamber 142 and the mixture gas nozzle 166 by forming a strong flow when being injected into the mixture chamber 142 through the exhaust gas inlet 194.

Exhaust gas that is guided through the second exhaust gas guide 181*b* ejects fuel that is supplied to the fuel inflow conduit 112 into the heat-absorbing chamber 156 by forming a strong flow while being injected into the heat-absorbing chamber 156 through the exhaust gas inlet 194.

Further, the ninth exemplary embodiment illustrates a case where the exhaust gas guide 181 and the first and second exhaust gas guides 181*a* and 181*b* are formed in the first exemplary embodiment, and the case can be equally applied to the second exemplary embodiment to the eighth exemplary embodiment.

Figure 13:
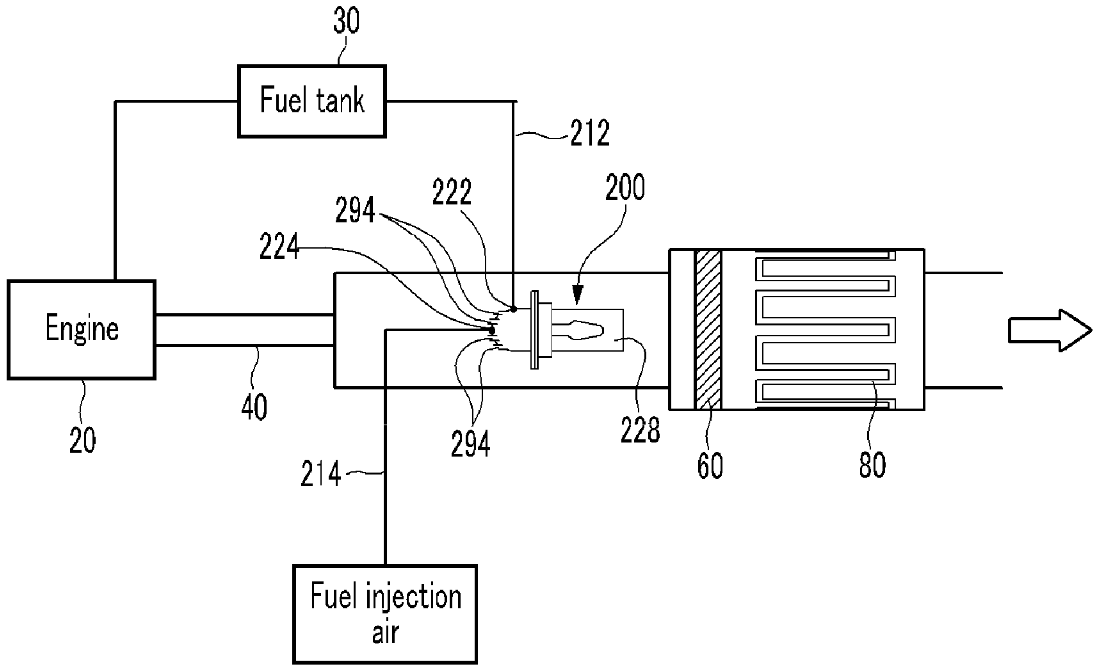
FIG. 13 is a block diagram of a DPF according to a tenth exemplary embodiment of the present invention.

FIG. 13 is a block diagram of a DPF according to a tenth exemplary embodiment of the present invention.

The DPF includes a fuel inflow conduit 212, an ejecting air inflow conduit 214, and a discharge air inflow conduit 216 that supply fuel, ejecting air, and exhaust gas, respectively, to the plasma burner 200.

The plasma burner 200 is provided within the exhaust conduit 40 between the engine 20 and the filter 80. The plasma burner 200 includes a fuel inlet 222, an ejecting air inlet 224, an exhaust gas inlet 294, and a flame vent 228 to be applied to the DPF.

Fuel is injected into the plasma burner 200 through the fuel inflow conduit 212 that is connected to the fuel inlet 222 and the fuel tank 30. The ejecting air inflow conduit 214 injects external air into the plasma burner 200 by connecting the ejecting air inlet 224 to the outside of the exhaust conduit 40. Air that is injected into the ejecting air inflow conduit 216 and the ejecting air inlet 224 ejects fuel that is injected into the fuel inflow conduit 212 and the fuel inlet 222 into the plasma burner 200.

Further, the fuel inflow conduit 212 and the ejecting air inlet 224 that supply fuel into the plasma burner 200 may be replaced with an injector (not shown) for directly injecting fuel into the electrode 250.

Further, the exhaust gas inlet 294 injects exhaust gas within the exhaust conduit 40 into the mixture chamber 242. Exhaust gas that is injected into the exhaust gas inlet 294 ejects a flame that is generated by a plasma discharge that is generated in a mixed gas of fuel and air to the flame vent 228.

The exhaust gas inlet 294 can sustain a mixed gas within the mixture chamber 242 at a high temperature by injecting exhaust gas therein.

Figure 14:
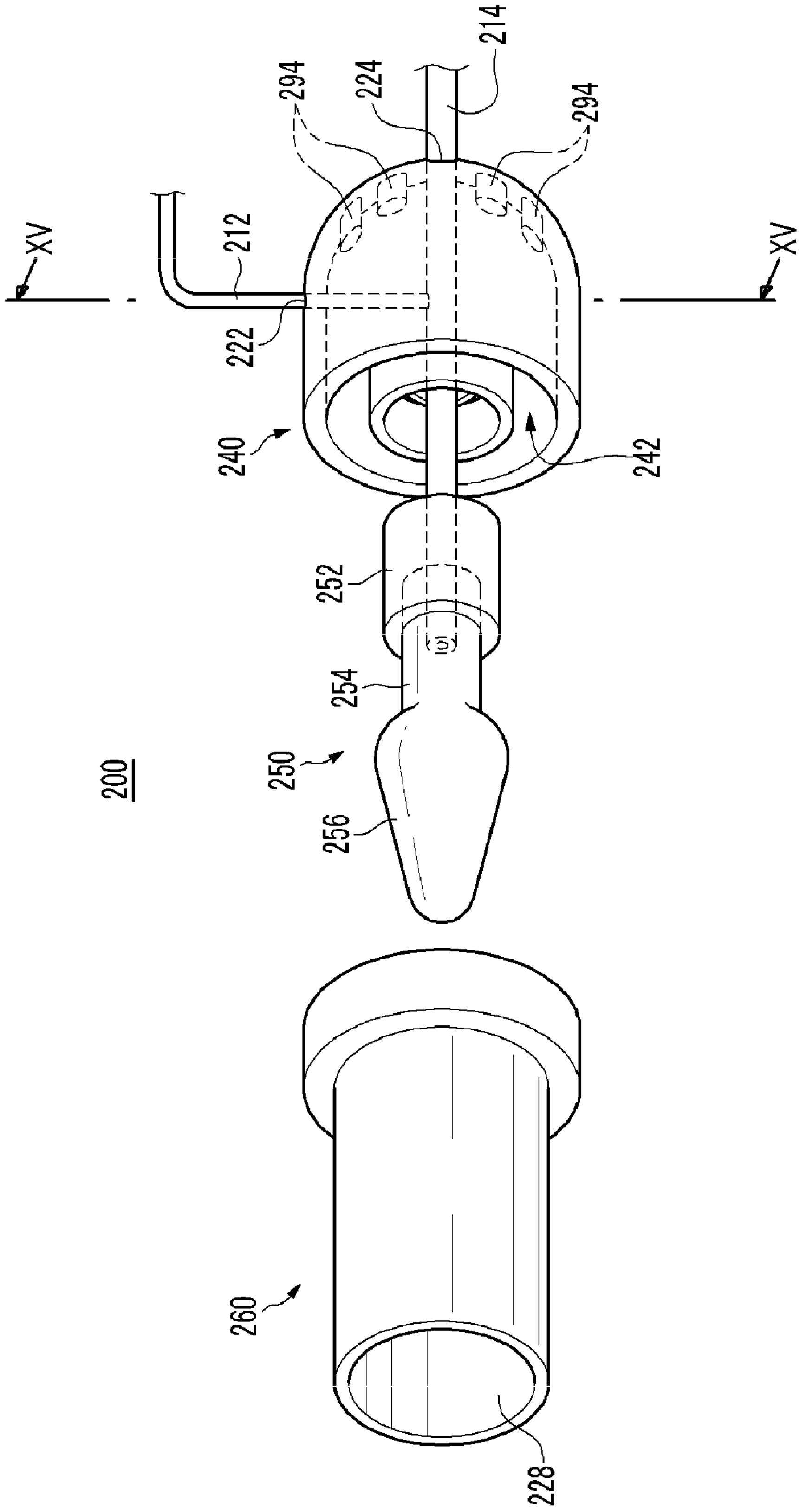
FIG. 14 is an exploded perspective view of a plasma burner that is shown in FIG. 13 according to the tenth exemplary embodiment of the present invention.
Figure 15:
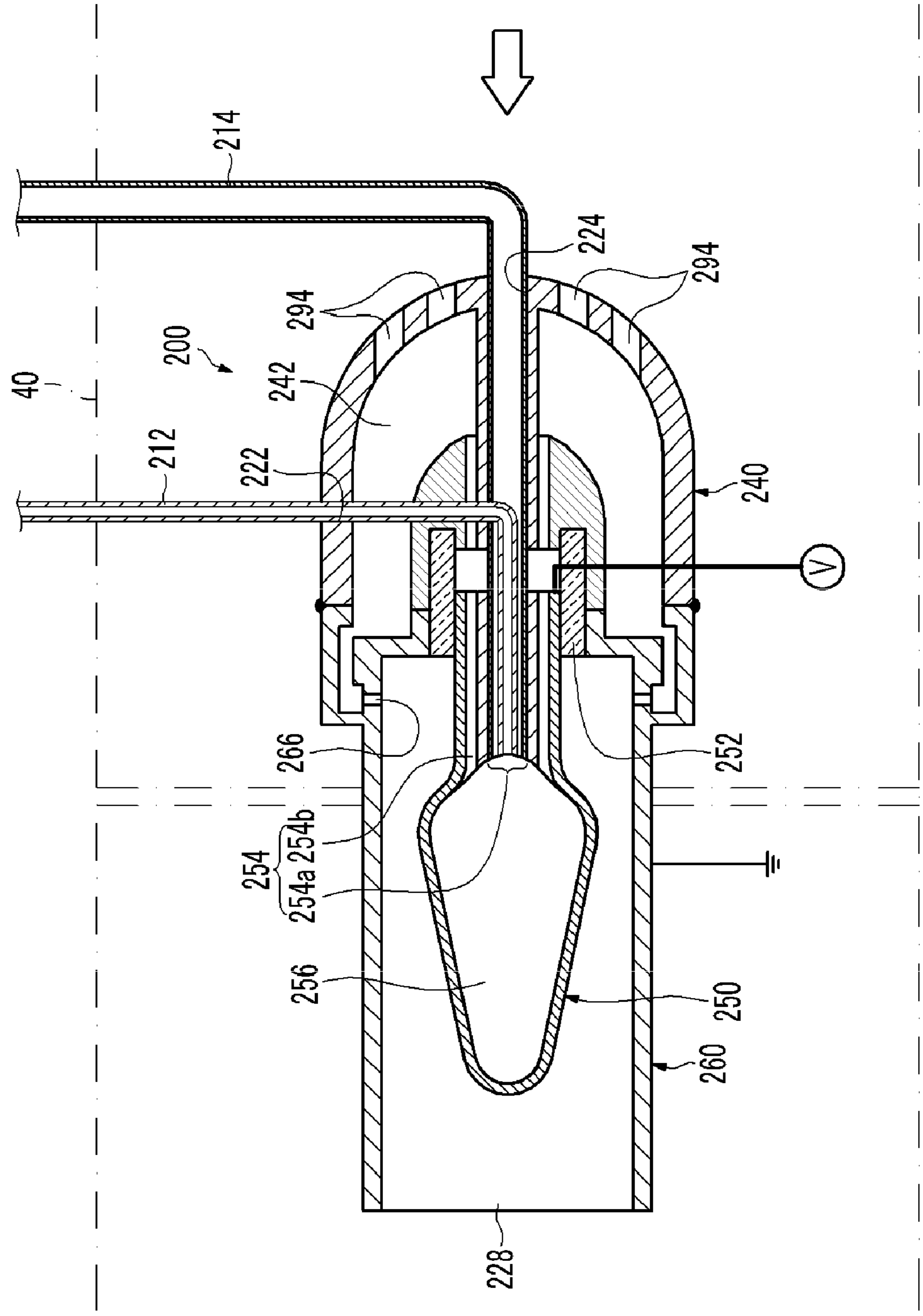
FIG. 15 is a cross-sectional view of the plasma burner taken along line XV-XV of FIG. 14.

FIG. 14 is an exploded perspective view of a plasma burner that is shown in FIG. 13 according to the tenth exemplary embodiment of the present invention, and FIG. 15 is a cross-sectional view of the plasma burner taken along line XV-XV of FIG. 14.

Referring to FIGS. 14 and 15, the plasma burner 200 includes a base 240, an electrode 250, and a reaction furnace 260.

In the base 240, a fuel inlet 222, an ejecting air inlet 224, and an exhaust gas inlet 294 are formed, and the base 240 includes a mixture chamber 242 that is formed at the inside thereof. Because the plasma burner 200 is provided within the exhaust conduit 40, in order to minimize prevention of flow of an exhaust gas, the plasma burner 200 is formed with a structure that minimizes resistance to flow of the exhaust gas.

For example, the base 240 has a curved surface shape that is convex toward the engine 20 side (a side opposite to that of the electrode). Exhaust gas that flows from the engine 20 side to the filter 80 side can be guided to the filter 80 side while receiving minimum resistance by the convex curved surface of the base 240.

The electrode 250 includes a mounting unit 254 that is mounted in the base 240 with an insulator 252 interposed therebetween, and a heat-absorbing chamber 256 that is formed at the inside thereof to extend to the mounting unit 254.

Fuel and air that are injected from the fuel inlet 222 and the ejecting air inlet 224 of the base 240, respectively, are injected to the heat-absorbing chamber 256 to be mixed in a mixed gas state and to be heated. The insulator 252 electrically insulates the electrode 250 from the base 240 or the reaction furnace 260.

The electrode 250 has a shape that is extended to an opposite side of the base 240 of the mounting unit 254 to form a maximum extension portion and that then gradually becomes narrow. That is, the heat-absorbing chamber 256 is formed in an approximate conical shape.

The mounting unit 254 forms a double passage by a double pipe and includes a first passage 254*a* that is formed at the inside and a second passage 254*b* that is formed at the outside of the first passage 254*a*. The ejecting air inflow conduit 214 is coupled to the first passage 254*a*. The heat-absorbing chamber 256 and the mixture chamber 242 are connected to the second passage 254*b*.

The ejecting air inflow conduit 214 is connected to the heat-absorbing chamber 256 that is formed at the center of the electrode 250 through the first passage 254*a*. The fuel inflow conduit 212 is provided within the ejecting air inflow conduit 214 to be connected to the heat-absorbing chamber 256.

Fuel that is supplied to the fuel inflow conduit 212 is supplied to one side of the heat-absorbing chamber 256 and is ejected into the heat-absorbing chamber 256 in a mixed gas state at the end of the fuel inflow conduit 212 by ejecting air that is supplied to the ejecting air inflow conduit 214.

Figure 16:
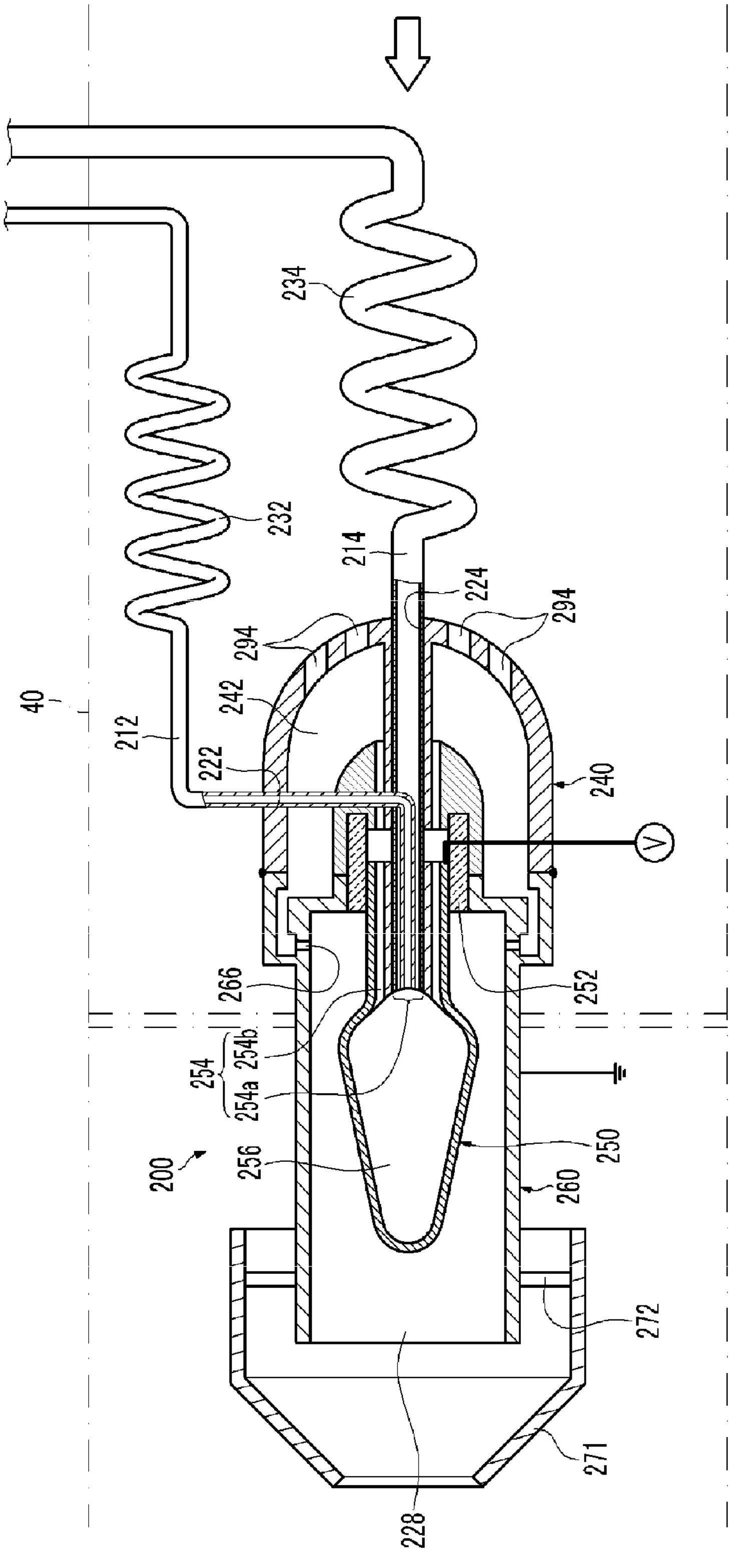
FIG. 16 is a cross-sectional view of a plasma burner according to an eleventh exemplary embodiment of the present invention.

FIG. 16 is a cross-sectional view of a plasma burner according to an eleventh exemplary embodiment of the present invention.

Referring to FIG. 16, the fuel inflow conduit 212 and the ejecting air inflow conduit 214 include the heat exchangers 232 and 234, respectively.

As an example, the heat exchanger 232 of the fuel inflow conduit 212 is formed in a coil shape to heat fuel that is supplied to the fuel inflow conduit 212 by increasing a heat-absorbing area within the exhaust conduit 40.

The heat exchanger 234 of the ejecting air inflow conduit 214 is formed in a coil shape to heat ejecting air that is supplied to the ejecting air inflow conduit 214 by increasing a heat-absorbing area within the exhaust conduit 40.

The heat exchangers 232 and 234 may be provided in both the fuel inflow conduit 212 and the ejecting air inflow conduit 214 (see FIG. 16), and may be formed in either one of the conduits or both conduits (not shown).

Figure 17:
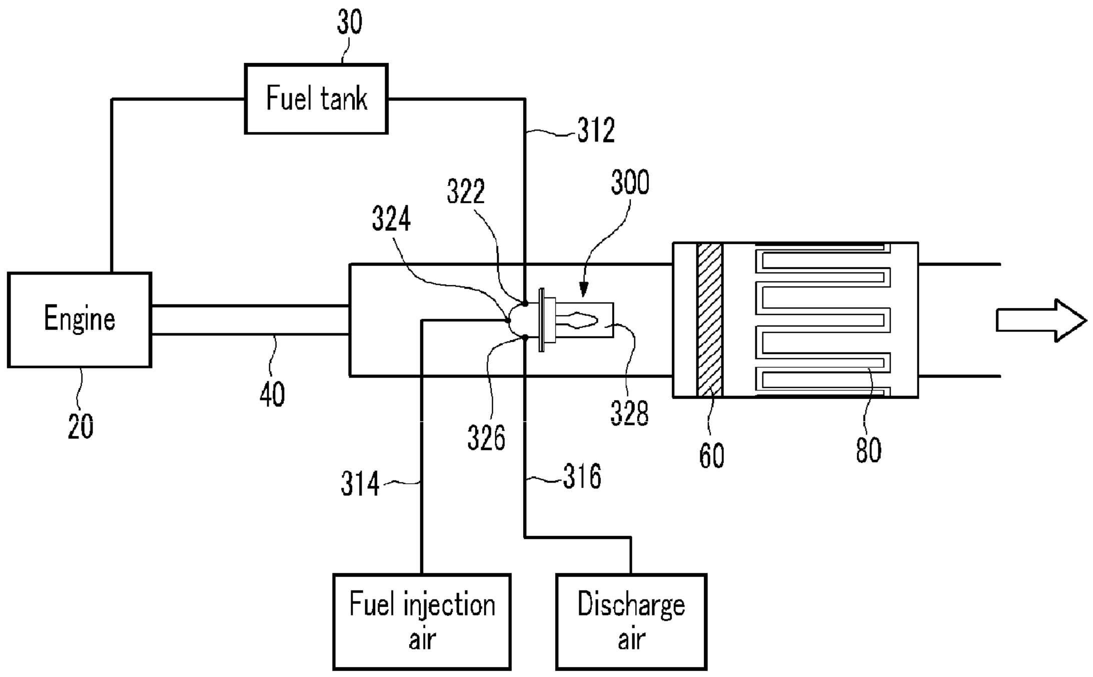
FIG. 17 is a block diagram of a DPF according to a twelfth exemplary embodiment of the present invention.

FIG. 17 is a block diagram of a DPF according to a twelfth exemplary embodiment of the present invention.

The DPF includes a fuel inflow conduit 312, an ejecting air inflow conduit 314, and a discharge air inflow conduit 316 that supply fuel, ejecting air, and discharge air, respectively, to a plasma burner 300.

The plasma burner 300 is provided within the exhaust conduit 40 between the engine 20 and the filter 80. The plasma burner 300 includes a fuel inlet 322, an ejecting air inlet 324, a discharge air inlet 326, and a flame vent 328 to be applied to the DPF.

The fuel inflow conduit 312 injects fuel into the plasma burner 300 by connecting the fuel inlet 322 and the fuel tank 30. The ejecting air inflow conduit 314 injects external air into the plasma burner 300 by connecting the ejecting air inlet 324 to the outside of the exhaust conduit 40. Ejecting air that is injected to the ejecting air inflow conduit 316 and the ejecting air inlet 324 ejects fuel that is injected to the fuel inflow conduit 312 and the fuel inlet 322 into the plasma burner 300.

The discharge air inflow conduit 316 injects external air into the plasma burner 300 by connecting the discharge air inlet 326 to the outside of the exhaust conduit 40. Discharge air that is injected to the discharge air inflow conduit 316 and the discharge air inlet 326 projects a flame that is generated by a plasma discharge that is generated in a mixed gas of fuel and air to the flame vent 328.

Figure 18:
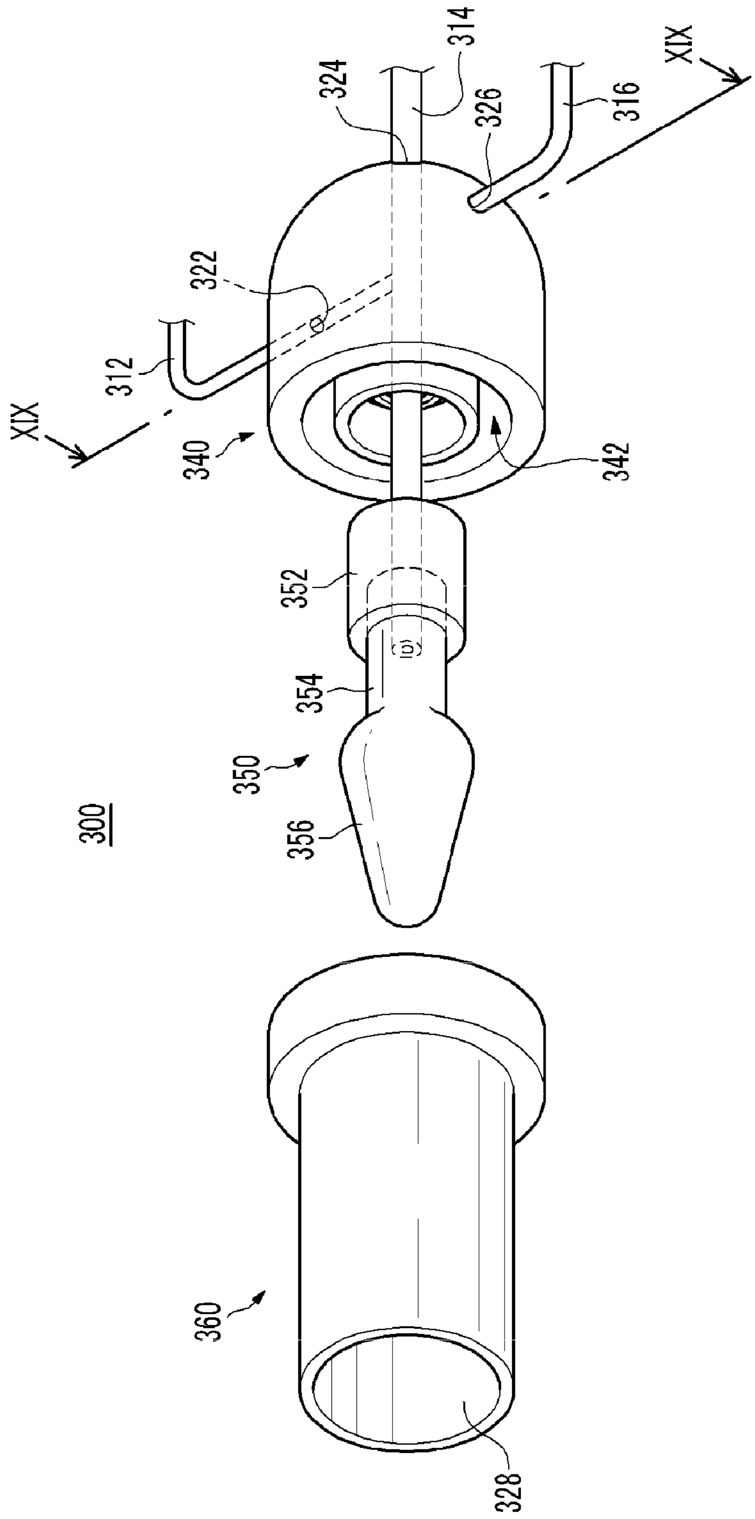
FIG. 18 is an exploded perspective view of a plasma burner that is shown in FIG. 17 according to the twelfth exemplary embodiment of the present invention.
Figure 19:
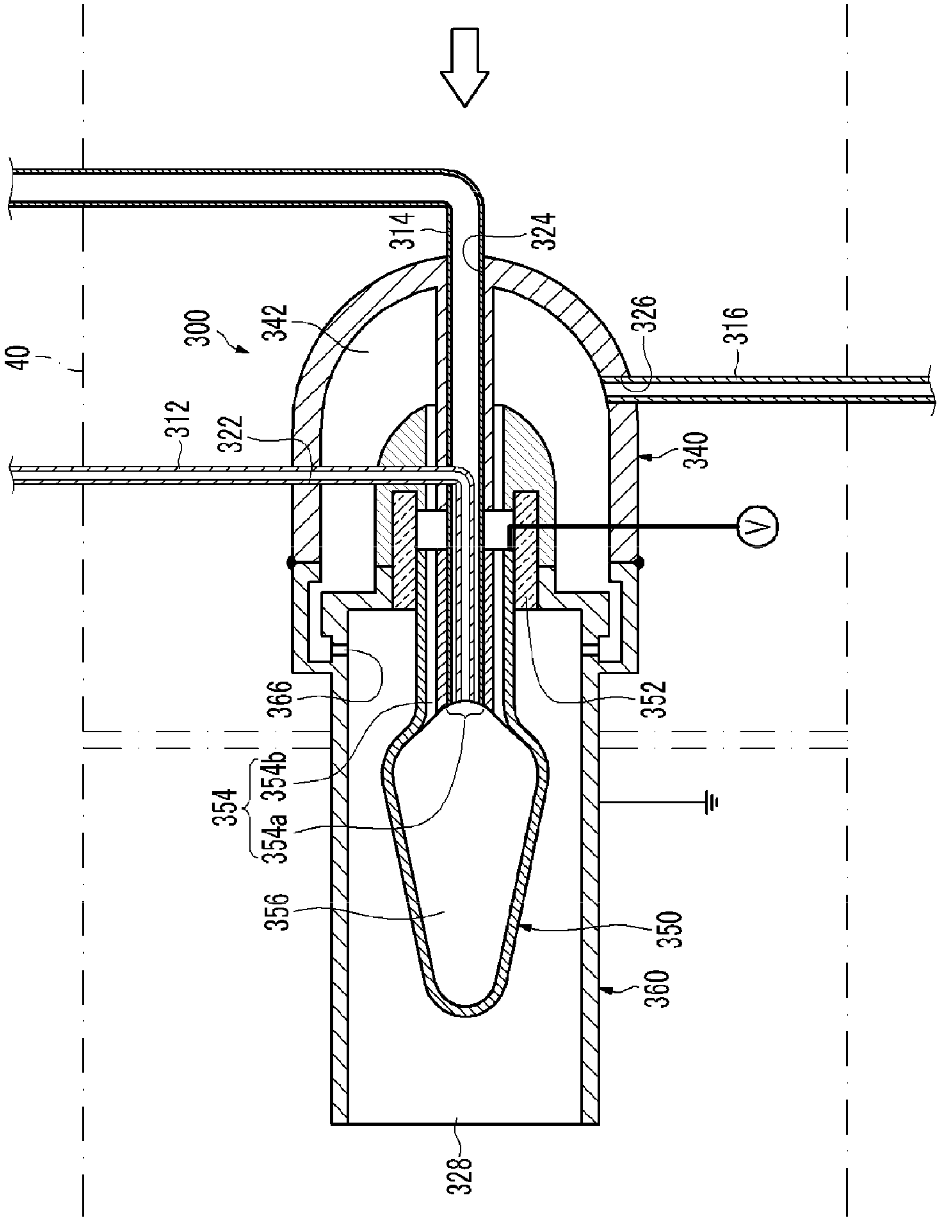
FIG. 19 is a cross-sectional view of the plasma burner taken along line XIX-XIX of FIG. 18.

FIG. 18 is an exploded perspective view of a plasma burner that is shown in FIG. 17 according to the twelfth exemplary embodiment of the present invention, and FIG. 19 is a cross-sectional view of the plasma burner taken along line XIX-XIX of FIG. 18.

Referring to FIGS. 18 and 19, the plasma burner 300 includes a base 340, an electrode 350, and a reaction furnace 360.

In the base 340, a fuel inlet 322, an ejecting air inlet 324, and a discharge air inlet 326 are formed, and the base 340 includes a mixture chamber 342 that is formed at the inside thereof. Because the plasma burner 300 is provided within the exhaust conduit 340, in order to minimize prevention of flow of exhaust gas, the plasma burner 300 is formed with a structure for minimizing resistance to flow of exhaust gas.

As an example, the base 340 has a curved surface shape that is convex toward the engine 20 side (a side opposite to that of the electrode). Exhaust gas that flows from the engine 20 side to the filter 80 side can be guided to the filter 80 side while receiving minimum resistance by the convex curved surface of the base 340.

The electrode 350 includes a mounting unit 354 that is mounted in the base 340 with an insulator 352 interposed therebetween, and a heat-absorbing chamber 356 that is extended to the mounting unit 354 to be formed in the inside thereof.

Fuel and air that are injected from the fuel inlet 322 and the ejecting air inlet 324 of the base 340, respectively, are injected into the heat-absorbing chamber 356 to be mixed in a mixed gas state and to be heated. The insulator 352 electrically insulates the electrode 350 from the base 340 or the reaction furnace 360.

The electrode 350 has a shape that is extended to an opposite side of the base 340 of the mounting unit 354 to form a maximum extension portion and that then gradually becomes narrow. That is, the heat-absorbing chamber 356 is formed in an approximate conical shape.

The mounting unit 354 forms a double passage by a double pipe and includes a first passage 354*a* that is formed at the inside thereof and a second passage 354*b* that is formed at the outside of the first passage 354*a*. The ejecting air inflow conduit 314 is coupled to the first passage 354*a*. The heat-absorbing chamber 356 and the mixture chamber 342 are connected to the second passage 354*b*.

The ejecting air inflow conduit 314 is connected to the heat-absorbing chamber 356 that is formed at the center of the electrode 350 through the first passage 354*a*. The fuel inflow conduit 312 is provided within the ejecting air inflow conduit 314 to be connected to the heat-absorbing chamber 356.

Fuel that is supplied to the fuel inflow conduit 312 is supplied to one side of the heat-absorbing chamber 356 and is ejected into the heat-absorbing chamber 356 in a mixed gas state by ejecting air that is supplied to the ejecting air inflow conduit 314 at the end of the fuel inflow conduit 312.

The mixed gas that is heated in the heat-absorbing chamber 356 is supplied to the mixture chamber 342 that is formed in the base 340 through the second passage 354*b*.

The discharge air inflow conduit 316 is connected to the mixture chamber 342. Discharge air that is supplied to the discharge air inflow conduit 316 ejects the mixed gas within the mixture chamber 342 into the reaction furnace 360 through the mixture gas nozzle 366.

A plasma discharge of the mixed gas of fuel and air facilitates oxidation in the oxidation catalyst 60 by reforming the mixed gas to a pre-oxidation material including hydrogen and carbon monoxide.

Figure 20:
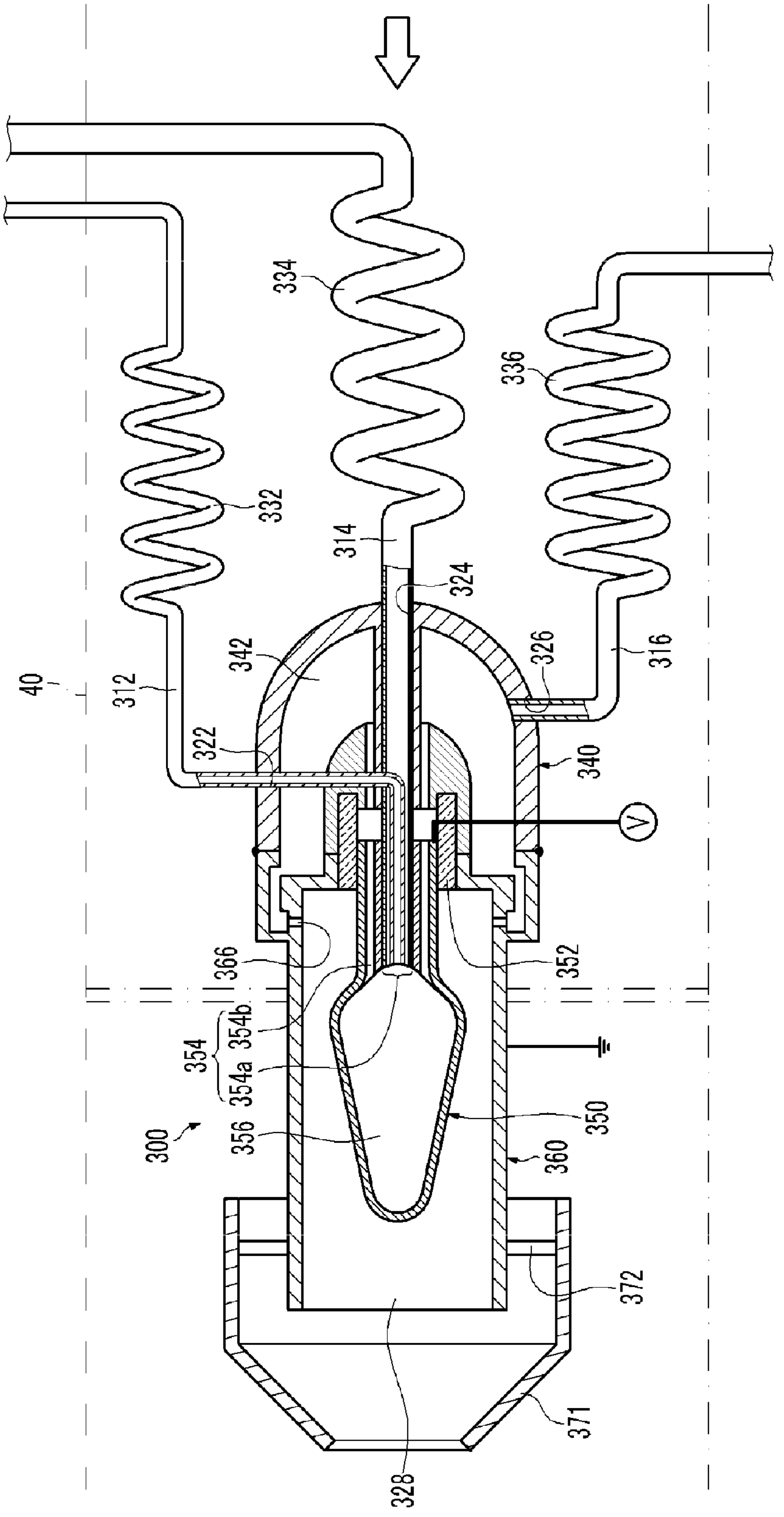
FIG. 20 is a cross-sectional view of a plasma burner according to a thirteenth exemplary embodiment of the present invention.

FIG. 20 is a cross-sectional view of a plasma burner according to a thirteenth exemplary embodiment of the present invention.

Referring to FIG. 20, the fuel inflow conduit 312, the ejecting air inflow conduit 314, and the discharge air inflow conduit 316 include heat exchangers 332, 334, and 336, respectively.

For example, the heat exchanger 332 of the fuel inflow conduit 312 is formed in a coil shape to increase a heat-absorbing area within the exhaust conduit 40, thereby heating fuel that is supplied to the fuel inflow conduit 312.

The heat exchanger 334 of the ejecting air inflow conduit 314 is formed in a coil shape to increase a heat-absorbing area within the exhaust conduit 40, thereby heating ejecting air that is supplied to the ejecting air inflow conduit 314.

The heat exchanger 336 of the discharge air inflow conduit 316 is formed in a coil shape to increase a heat-absorbing area within the exhaust conduit 40, thereby heating fuel that is supplied to the discharge air inflow conduit 316.

The heat exchangers 332, 334, and 336 may be provided in all of the fuel inflow conduit 312, the ejecting air inflow conduit 314, and the discharge air inflow conduit 316 (see FIG. 20), and may be formed in either one of the conduits or both conduits (not shown).

Figure 21:
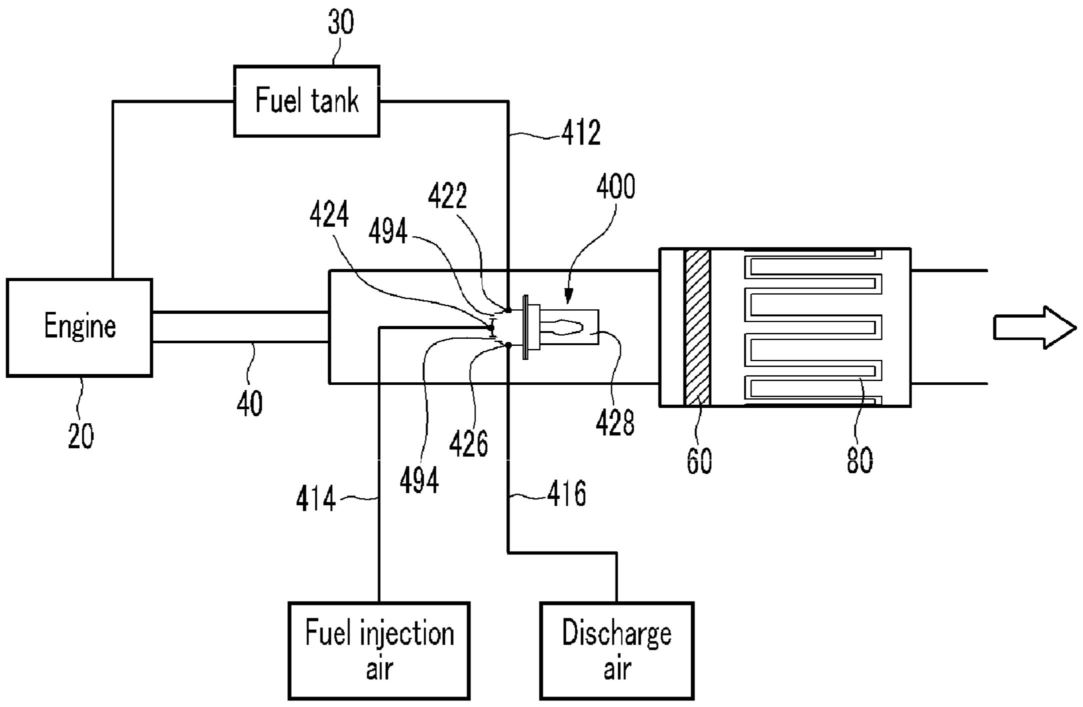
FIG. 21 is a block diagram of a DPF according to a fourteenth exemplary embodiment of the present invention.

FIG. 21 is a block diagram of a DPF according to a fourteenth exemplary embodiment of the present invention.

The DPF includes a fuel inflow conduit 412, an ejecting air inflow conduit 414, and a discharge air inflow conduit 416 that supply fuel, ejecting air, discharge air, and an exhaust gas, respectively to a plasma burner 400.

The plasma burner 400 is provided within the exhaust conduit 40 between the engine 20 and the filter 80. The plasma burner 400 includes a fuel inlet 422, an ejecting air inlet 424, a discharge air inlet 426, an exhaust gas inlet 494, and a flame vent 428 so as to be applied to the DPF.

The fuel inflow conduit 412 connects the fuel inlet 422 and the fuel tank 30 to inject fuel into the plasma burner 400. The ejecting air inflow conduit 414 connects the ejecting air inlet 424 to the outside of the exhaust conduit 40 to inject external air into the plasma burner 400. Ejecting air that is injected to the ejecting air inflow conduit 416 and the ejecting air inlet 424 ejects fuel that is injected to the fuel inflow conduit 412 and the fuel inlet 422 into the plasma burner 400.

Further, the fuel inflow conduit 412 and the ejecting air inlet 424 that supply fuel into the plasma burner 400 may be replaced with an injector (not shown) that directly injects fuel into the electrode 450.

The discharge air inflow conduit 416 connects the discharge air inlet 426 to the outside of the exhaust conduit 40 to inject external air into the plasma burner 400. Discharge air that is injected to the discharge air inflow conduit 416 and the discharge air inlet 426 projects a flame that is generated by a plasma discharge that is generated in the mixed gas of fuel and air to the flame vent 428.

Further, the exhaust gas inlet 494 injects exhaust gas within the exhaust conduit 40 into the mixture chamber 442. Exhaust gas that is injected into the exhaust gas inlet 494 projects a flame that is generated by a plasma discharge that is generated in the mixed gas to the flame vent 428 while flowing together with discharge air.

The exhaust gas inlet 494 can reduce an amount of air that is supplied to the discharge air inflow conduit 416 and sustain a mixed gas within the 442 at a higher temperature.

Figure 22:
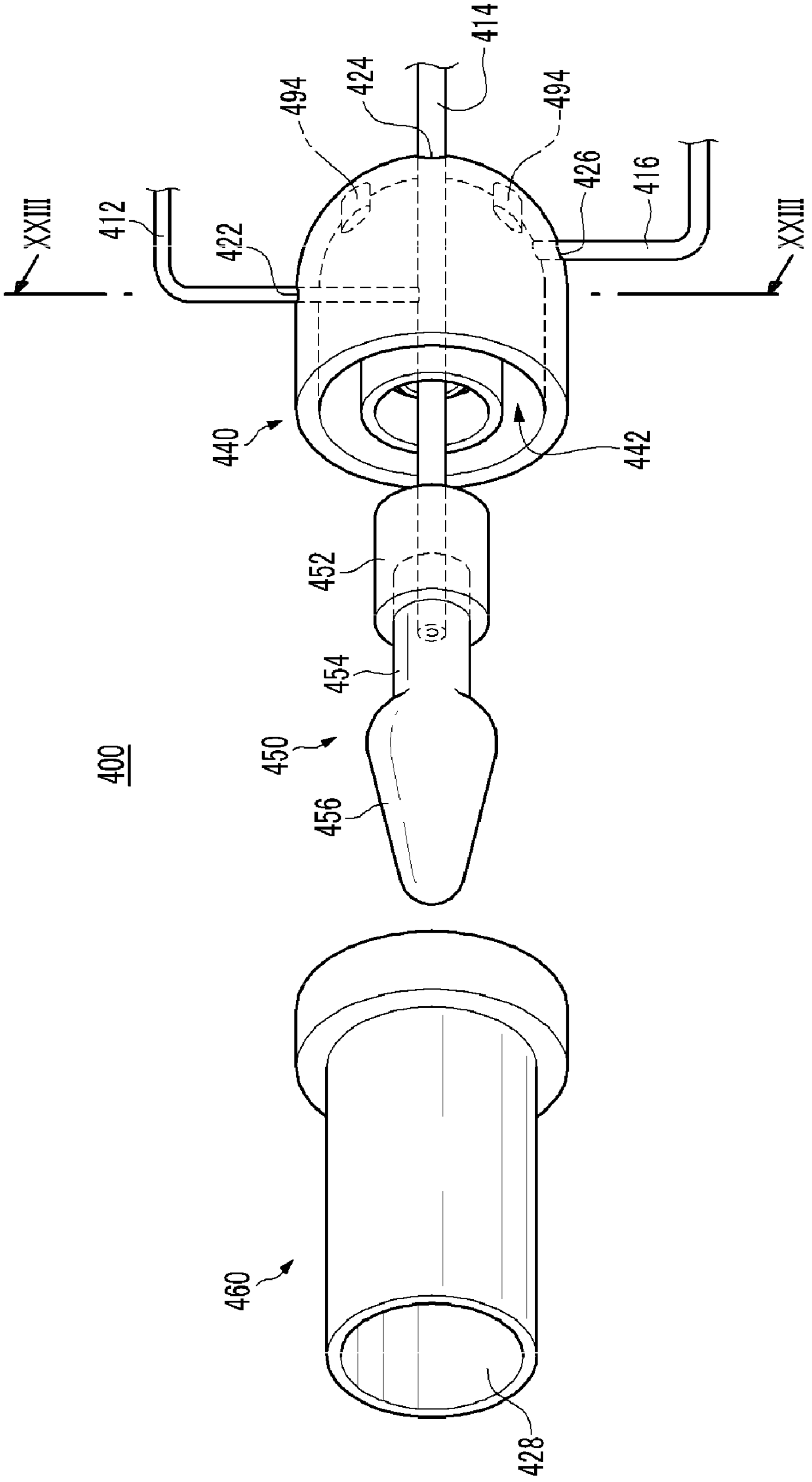
FIG. 22 is an exploded perspective view of a plasma burner that is shown in FIG. 21 according to the fourteenth exemplary embodiment of the present invention.
Figure 23:
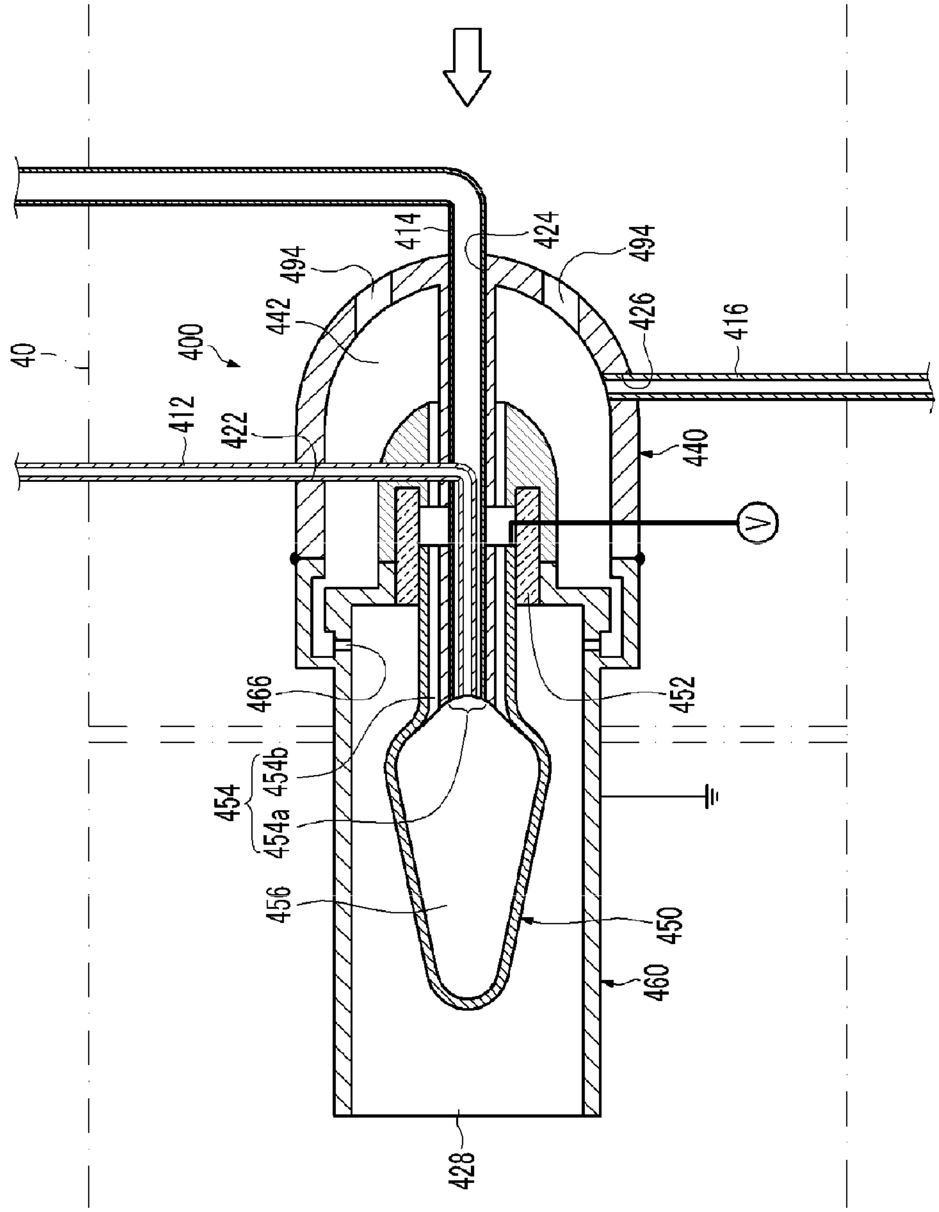
FIG. 23 is a cross-sectional view of the plasma burner taken along line XXIII-XXIII of FIG. 22.

FIG. 22 is an exploded perspective view of a plasma burner that is shown in FIG. 21 according to the fourteenth exemplary embodiment of the present invention, and FIG. 23 is a cross-sectional view of the plasma burner taken along line XXIII-XXIII of FIG. 22.

Referring to FIGS. 22 and 23, the plasma burner 400 includes a base 440, an electrode 450, and a reaction furnace 460.

In the base 440, a fuel inlet 422, an ejecting air inlet 424, a discharge air inlet 426, and an exhaust gas inlet 494 are formed, and the base 440 includes a mixture chamber 442 that is formed at the inside thereof. Because the plasma burner 400 is provided within the exhaust conduit 40, in order to minimize prevention of flow of exhaust gas, the plasma burner 400 is formed in a structure for minimizing resistance to flow of the exhaust gas.

As an example, the base 440 has a curved surface shape that is convex toward the engine 20 side (a side opposite to that of the electrode). Exhaust gas that flows from the engine 20 side to the filter 80 side can be guided to the filter 80 side while receiving minimum resistance by the convex curved surface of the base 440.

The electrode 450 includes a mounting unit 454 that is mounted in the base 440 with an insulator 452 interposed therebetween, and a heat-absorbing chamber 456 that is formed at the inside that is extended to the mounting unit 454.

Fuel and air that are injected from the fuel inlet 422 and the ejecting air inlet 424, respectively, of the base 440 are injected into the heat-absorbing chamber 456 to be mixed in a mixed gas state and to be heated. The insulator 452 electrically insulates the electrode 450 from the base 440 or a reaction furnace 460.

The electrode 450 has a shape that is extended to an opposite side of the base 440 of the mounting unit 454 to form a maximum extension portion and that then gradually becomes narrow. That is, the heat-absorbing chamber 456 is formed in an approximate conical shape.

The mounting unit 454 forms a double passage by a double pipe and includes a first passage 454*a* that is formed at the inside thereof and a second passage 454*b* that is formed at the outside of the first passage 454*a*. The ejecting air inflow conduit 414 is coupled to the first passage 454*a*. The heat-absorbing chamber 456 and the mixture chamber 442 are connected to the second passage 454*b*.

The ejecting air inflow conduit 414 is connected to the heat-absorbing chamber 456 that is formed at the center of the electrode 450 through the first passage 454*a*. The fuel inflow conduit 412 is provided within the ejecting air inflow conduit 414 to be connected to the heat-absorbing chamber 456.

Fuel that is supplied to the fuel inflow conduit 412 is supplied to one side of the heat-absorbing chamber 456 and is ejected in a mixed gas state into the heat-absorbing chamber 456 by ejecting air that is supplied to the ejecting air inflow conduit 414 at the end of the fuel inflow conduit 412.

A mixed gas that is heated in the heat-absorbing chamber 456 is supplied to the mixture chamber 442 that is formed in the base 440 through the second passage 454*b*.

The discharge air inflow conduit 416 and the exhaust gas inlet 494 are connected to the mixture chamber 442. Discharge air and exhaust gas that are supplied to the discharge air inflow conduit 416 and the exhaust gas inlet 494, respectively, eject the mixed gas within the mixture chamber 442 into the reaction furnace 460 through the mixture gas nozzle 466.

A plasma discharge that is generated in the mixed gas of fuel and air and exhaust gas facilitates oxidation in the oxidation catalyst 60 by burning of the mixed gas or reforming a part of the mixed gas to a pre-oxidation material including hydrogen and carbon monoxide.

Figure 24:
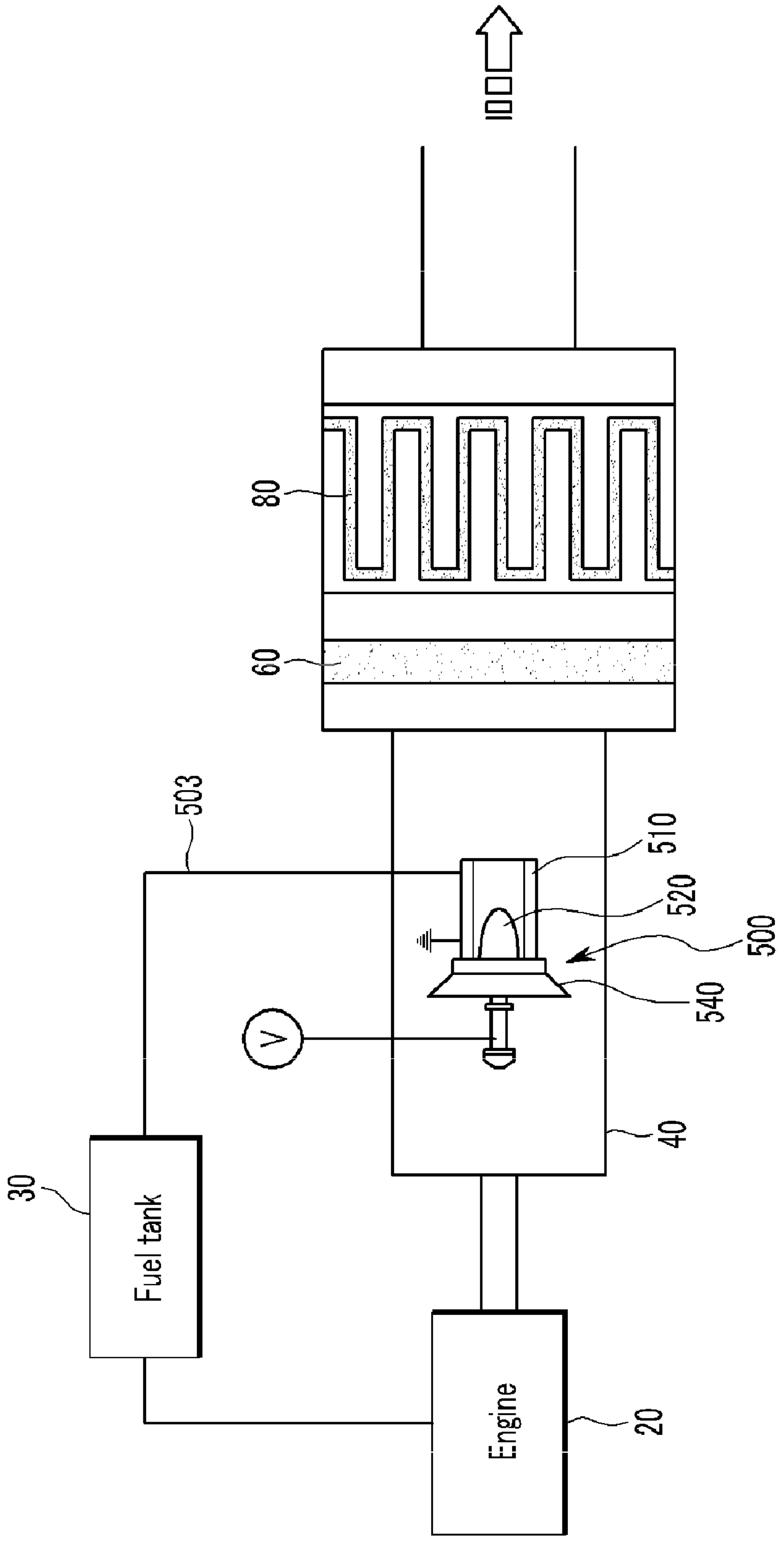
FIG. 24 is a block diagram of a DPF according to a fifteenth exemplary embodiment of the present invention.

FIG. 24 is a block diagram of a DPF according to a fifteenth exemplary embodiment of the present invention.

The DPF includes a fuel inflow conduit 503 for connecting the fuel tank 30 and the plasma burner 500 in order to supply fuel to the plasma burner 500.

Figure 25:
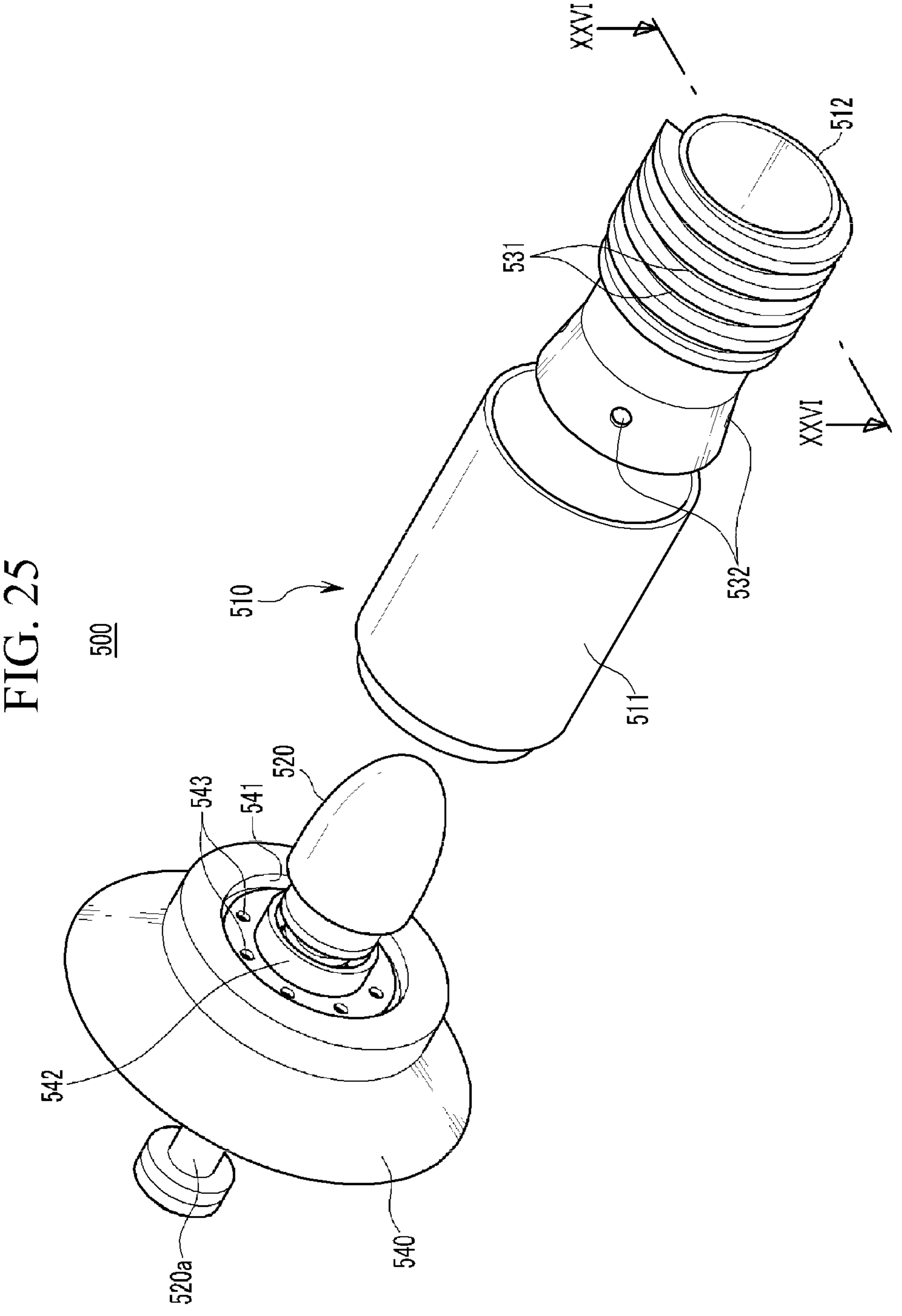
FIG. 25 is an exploded perspective view of a plasma burner that is shown in FIG. 24 according to the fifteenth exemplary embodiment of the present invention.
Figure 26:
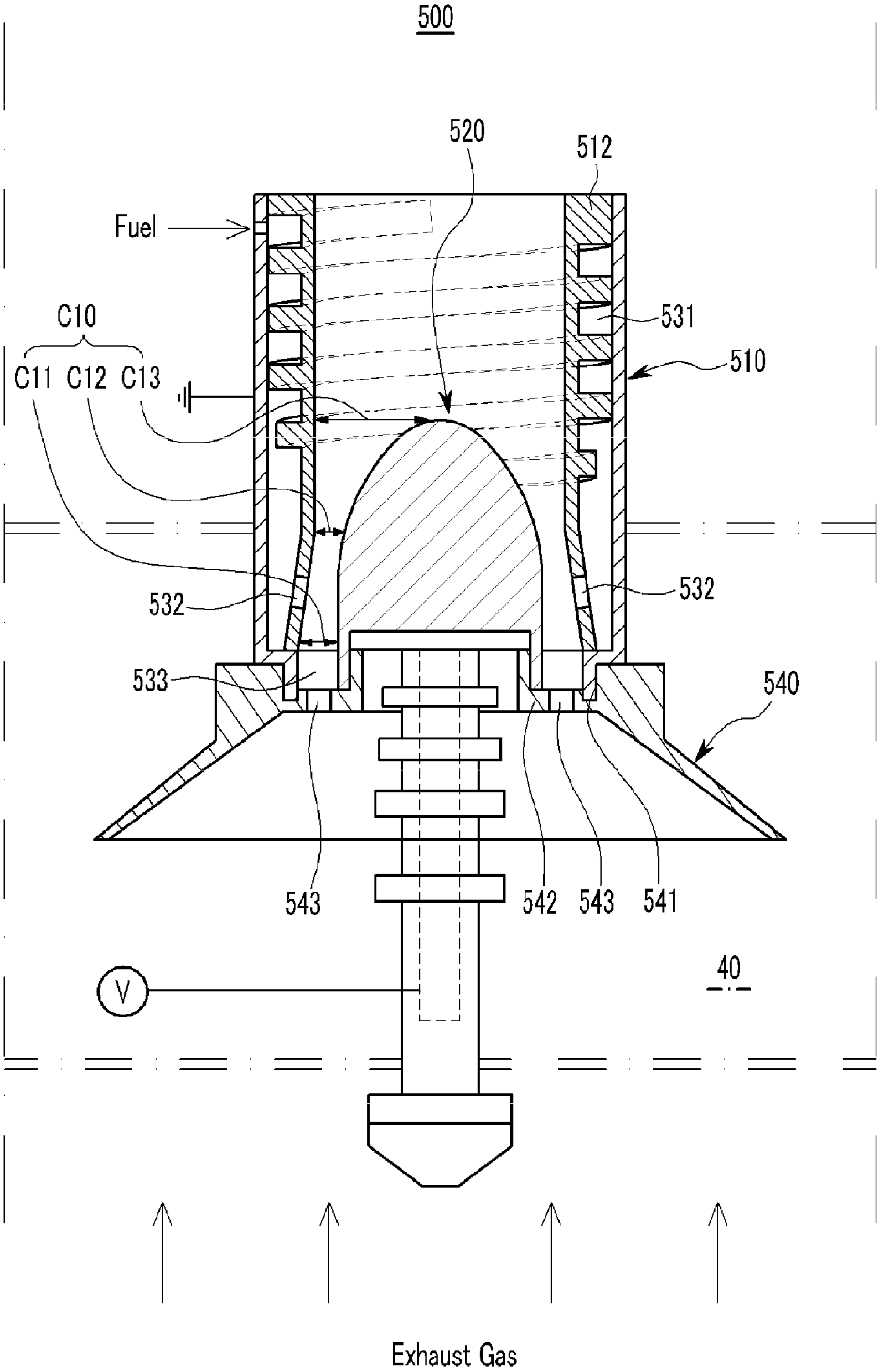
FIG. 26 is a cross-sectional view of the plasma burner taken along line XXVI-XXVI of FIG. 25.

FIG. 25 is an exploded perspective view of a plasma burner that is shown in FIG. 24 according to the fifteenth exemplary embodiment of the present invention, and FIG. 26 is a cross-sectional view of the plasma burner taken along line XXVI-XXVI of FIG. 25.

Referring to FIGS. 25 and 26, the plasma burner 500 includes a reaction furnace 510, an electrode 520, and a guide member 540.

The reaction furnace 510 is provided in the same direction as a flowing direction of an exhaust gas within the exhaust conduit 40 to pass through a part of the exhaust gas within the exhaust conduit 40.

The electrode 520 is provided within the reaction furnace 510 and forms a distance C10 between an external surface of the electrode 520 and an internal surface of the reaction furnace 510 in order to generate a plasma discharge.

The reaction furnace 510 forms a preheating passage 531, a fuel inlet 532, an exhaust gas inlet 533, and a flame vent 534. For this purpose, the reaction furnace 510 includes an external cylinder 511 and an internal cylinder 512.

The external cylinder 511 forms an external appearance of the reaction furnace 510 to be exposed to the exhaust gas that passes through the inside of the exhaust conduit 40. The internal cylinder 512 is coupled to the inside of the external cylinder 511 to form a preheating passage 531 between the external cylinder 511 and the internal cylinder 512.

The preheating passage 531 connects the fuel inflow conduit 503 and the fuel inlet 532 to each other to preheat fuel that is supplied from the fuel tank 30. The preheating passage 531 is formed in a direction opposite to that of a flow of an exhaust gas in the reaction furnace 510 and forms a path of the fuel, thereby increasing preheating efficiency of fuel.

That is, in order to supply fuel from the flame vent 534 side to the exhaust gas inlet 533 side, the preheating passage 531 is formed in a spiral structure that advances from the flame vent 534 side to the exhaust gas inlet 533 side. The fuel inflow conduit 503 is connected to the oxidation catalyst 60 side, and the fuel inlet 532 is connected to the engine 20 side.

The fuel inlet 532 is formed toward the electrode 520 in order to supply preheated fuel while passing though the preheating passage 531 to the space between the reaction furnace 510 and the electrode 520. The fuel inlet 532 is formed to penetrate the internal cylinder 512.

The exhaust gas inlet 533 injects a part of the exhaust gas within the exhaust conduit 40 into the plasma burner 500 to mix fuel and exhaust gas that are injected into the reaction furnace 510 through the fuel inlet 532.

The exhaust gas inlet 533 is formed in the engine 20 side of the reaction furnace 510 in order to induce a mixed gas of fuel and exhaust gas to the space between the reaction furnace 510 and the electrode 520. That is, the exhaust gas inlet 533 is formed between the electrode 520 and the internal cylinder 512 of the reaction furnace 510 to inject exhaust gas.

The internal cylinder 512 that forms an outer side of the exhaust gas inlet 533 forms an inner surface 512*a* of a cone that is largely opened while advancing from the electrode 520 side to the exhaust gas inlet 533 side.

The fuel inlet 532 is formed in the inner surface 512*a* side of the cone to connect the preheating passage 531 between the reaction furnace 510 and the electrode 520. Therefore, fuel that is injected into the fuel inlet 532 is mixed with exhaust gas after passing through the exhaust gas inlet 533.

By providing the fuel inlet 532 in the exhaust gas inlet 533 side, a separate chamber (not shown) for mixing exhaust gas and fuel is unnecessary. That is, the structure for mixing exhaust gas and fuel becomes simple.

Further, the guide member 540 is provided at the exhaust gas inlet 533 side. Because the guide member 540 is formed to have a greater diameter than that of the exhaust gas inlet 533, the guide member 540 induces exhaust gas within the exhaust conduit 40 to the exhaust gas inlet 533. The guide member 540 allows mixing more exhaust gas to a unit fuel that is injected to the fuel inlet 533.

The guide member 540 includes a first coupler 541, a second coupler 542, and a connector 543. The first coupler 541 is coupled to an end portion of the exhaust gas inlet 533 side of the reaction furnace 510, i.e., an end portion 511*a* of the external cylinder 511.

The second coupler 542 is formed within the first coupler 541 to be coupled to an end portion 520*a* of the electrode 520. The first coupler 541 and the second coupler 542 are disposed apart from each other to form a space therebetween.

The connector 543 is formed in the space between the first coupler 541 and the second coupler 542 to connect the exhaust gas inlet 533 to the inside of the exhaust conduit 40.

Exhaust gas that is induced to the guide member 540 is injected into the exhaust gas inlet 533 via the connector 543 that is formed between the first coupler 541 and the second coupler 542 to be supplied to the space between the electrode 520 and the reaction furnace 510 in a mixed gas state in which fuel and exhaust gas are mixed.

The space C10 that is formed between the reaction furnace 510 and the electrode 520 is gradually reduced while advancing to the flame vent 534 side in an enlarged state from the exhaust gas inlet 533 side, is again gradually enlarged after being formed in a minimum size, and then is formed in a maximum size.

As an example, the space C10 that is formed between the electrode 520 and the reaction furnace 510 forms a first space C11, a second space C12, and a third space C13 having different sizes.

The first space C11 is formed at the exhaust gas inlet 533 side. The space C10 is gradually reduced to be smaller than the first space C11 while advancing from the first space C11 to the flame vent 534 side.

The second space C12 is formed in the inner surface 512*a* of the cone to be formed in a minimum size. The space C10 is gradually enlarged to be larger than the first space C11 while advancing to the flame vent 534 side from the second space C12.

The third space C13 is formed in the flame vent 534 side to form a maximum size.

In order to form the first space C11, the second space C12, and the third space C13, the electrode 520 is formed in a cylinder to correspond to the inner surface 512*a* of the cone of the internal cylinder 512, and is gradually more thinly formed while advancing from the end of the inner surface 512*a* of the cone to the flame vent 534 side.

Figure 27:
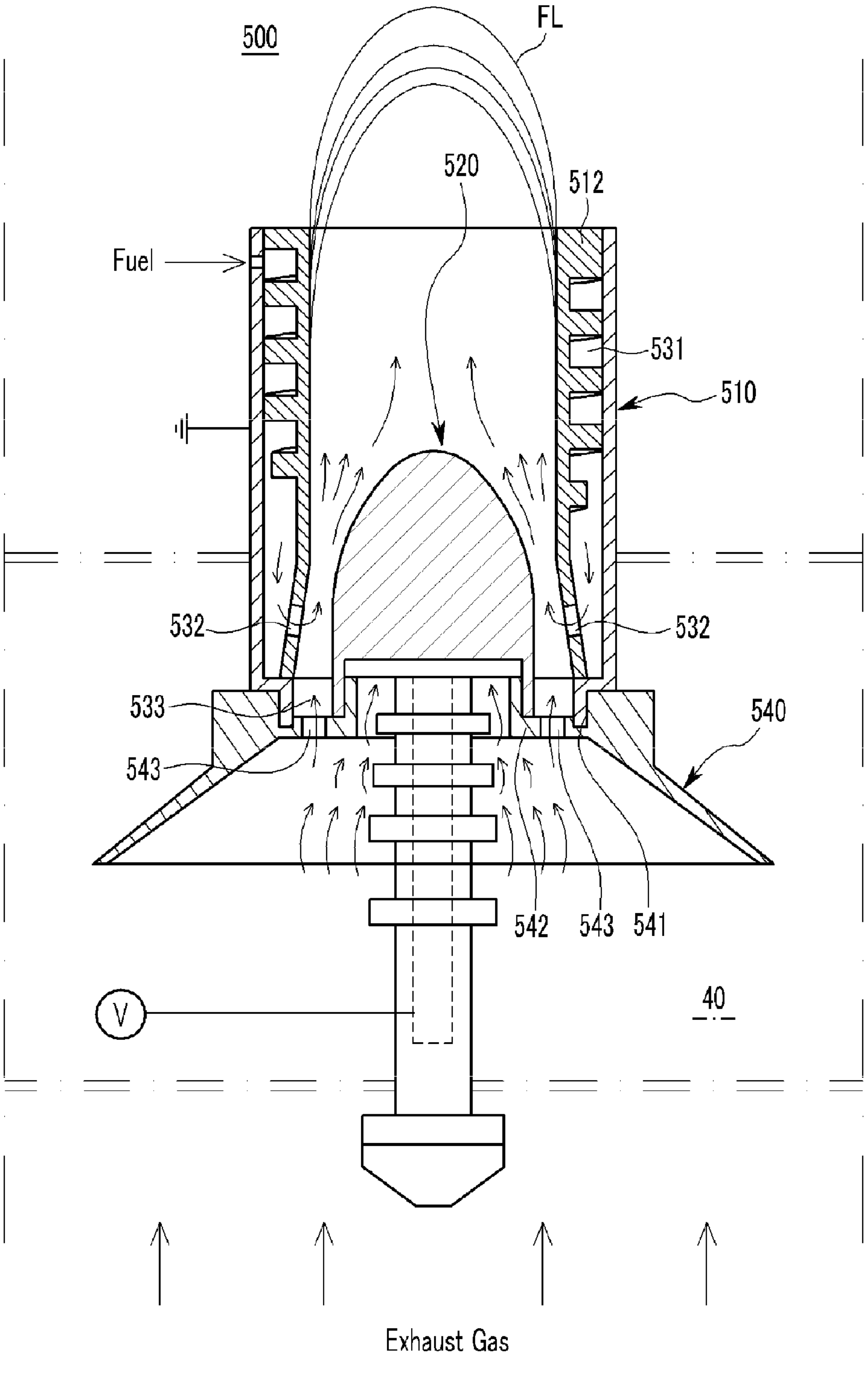
FIG. 27 is a diagram illustrating a state where a flame is ejected from the plasma burner according to the fifteenth exemplary embodiment of the present invention.

FIG. 27 is a diagram illustrating a state where a flame is projected from the plasma burner according to the fifteenth exemplary embodiment of the present invention.

Referring to FIG. 27, exhaust gas that is injected into the exhaust gas inlet 533 is mixed with fuel that is injected to the fuel inlet 532, and the mixed gas is supplied to a space between the electrode 520 and the internal cylinder 512 of the reaction furnace 510.

By grounding the reaction furnace 510 and applying a voltage (V) to the electrode 520 through a voltage applying unit 520*a*, the reaction furnace 510 and the electrode 520 generate and extinguish a plasma discharge according to the space C10 that is formed therebetween.

According to generating and extinction of a plasma discharge, the mixed gas generates a flame FL according to a flow of the exhaust gas after a plasma discharge. The flame FL is projected through the flame vent 534 to further heat the exhaust gas within the exhaust conduit 40.

That is, a plasma discharge that is generated between the electrode 520 and the reaction furnace 510 repeatedly performs processes of generating in a portion at which the space C10 (a second space C12) between the electrode 520 and the reaction furnace 510 is smallest, being extinguished after being gradually diffused while advancing to a portion (a third space C13) at which a distance thereof is wide, being again generated in a portion at which a distance is narrow (the second space C12), and being extinguished after being gradually diffused while advancing to a portion at which a distance is wide (the third space C13).

A plasma discharge in the mixed gas of fuel and exhaust gas facilitates oxidation in the oxidation catalyst 60 by burning the mixed gas or reforming a part of the mixed gas to a pre-oxidation material including hydrogen and carbon monoxide.

In entire configuration and effect, the sixteenth exemplary embodiment and the seventeenth exemplary embodiment are similar to or equal to those of the fifteenth exemplary embodiment. Therefore, in the sixteenth exemplary embodiment and the seventeenth exemplary embodiment, portions different from those of the fifteenth exemplary embodiment will be described.

Figure 28:
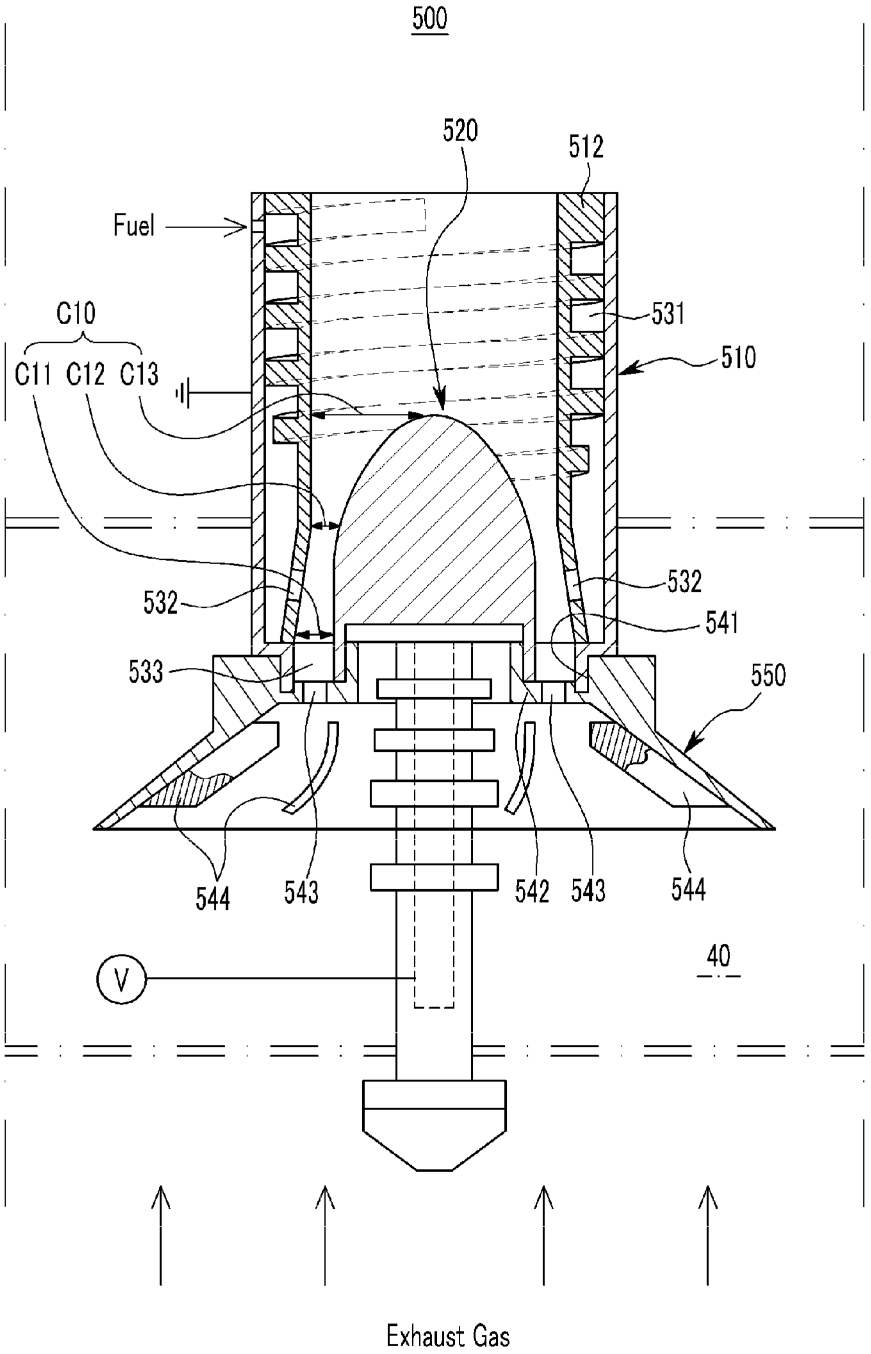
FIG. 28 is a cross-sectional view of a plasma burner according to a sixteenth exemplary embodiment of the present invention.
Figure 29:
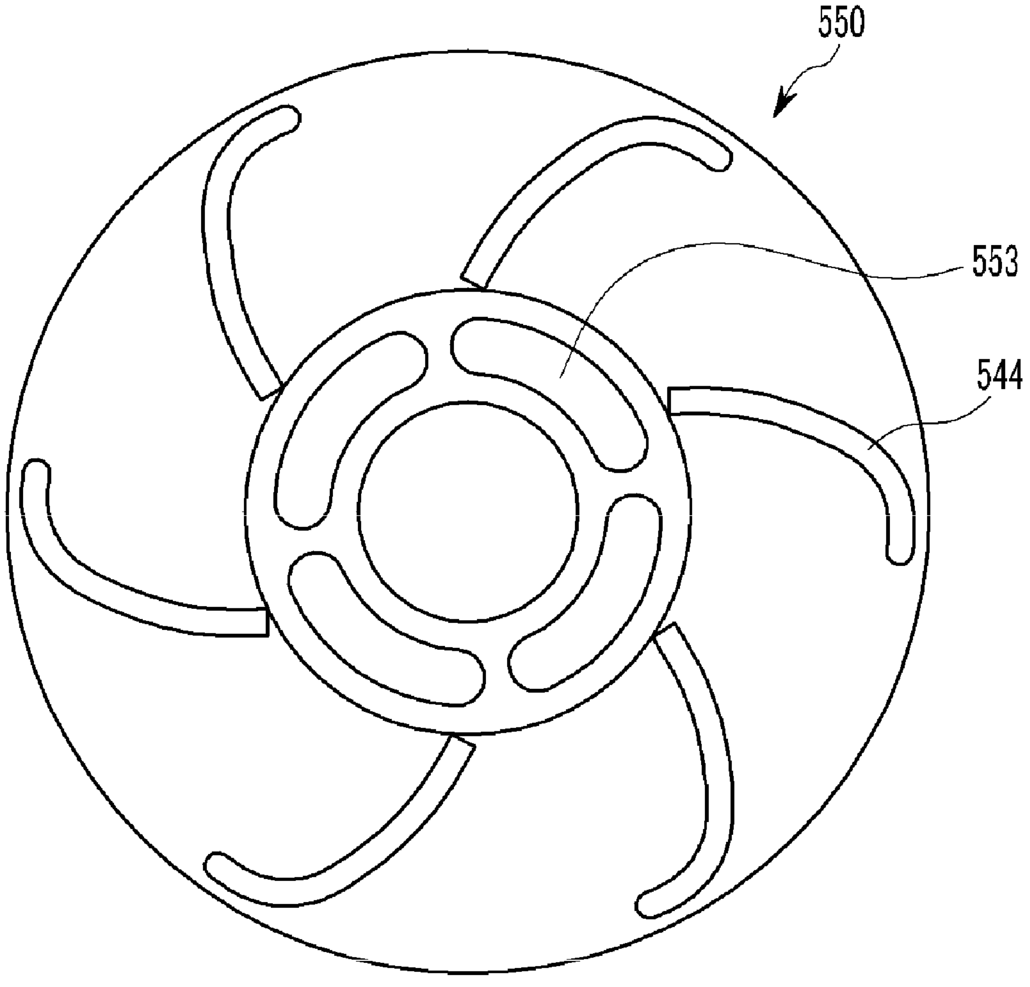
FIG. 29 is a bottom view of the plasma burner of FIG. 28.

FIG. 28 is a cross-sectional view of a plasma burner according to a sixteenth exemplary embodiment of the present invention, and FIG. 29 is a bottom view of the plasma burner of FIG. 28.

Referring to FIGS. 28 and 29, a guide member 550 further includes a vein 544 in an inner surface thereof. A plurality of veins 544 are formed in the inner surface of the guide member

550 to cause a swirl flow pattern in exhaust gas that is injected to the guide member 550 from the inside of the exhaust conduit 40.

Therefore, exhaust gas that passes through the veins 544 of the guide member 550 is supplied to a space between the reaction furnace 510 and the electrode 520 while causing a swirl flow pattern. In this case, a connector 553 is formed to a maximum size in order to minimize swirl flow resistance. In FIG. 29, the connector 553 is formed along a curvature of the guide member 550.

Exhaust gas with a swirl flow pattern can be effectively mixed with fuel between the reaction furnace 510 and the electrode 520.

Figure 30:
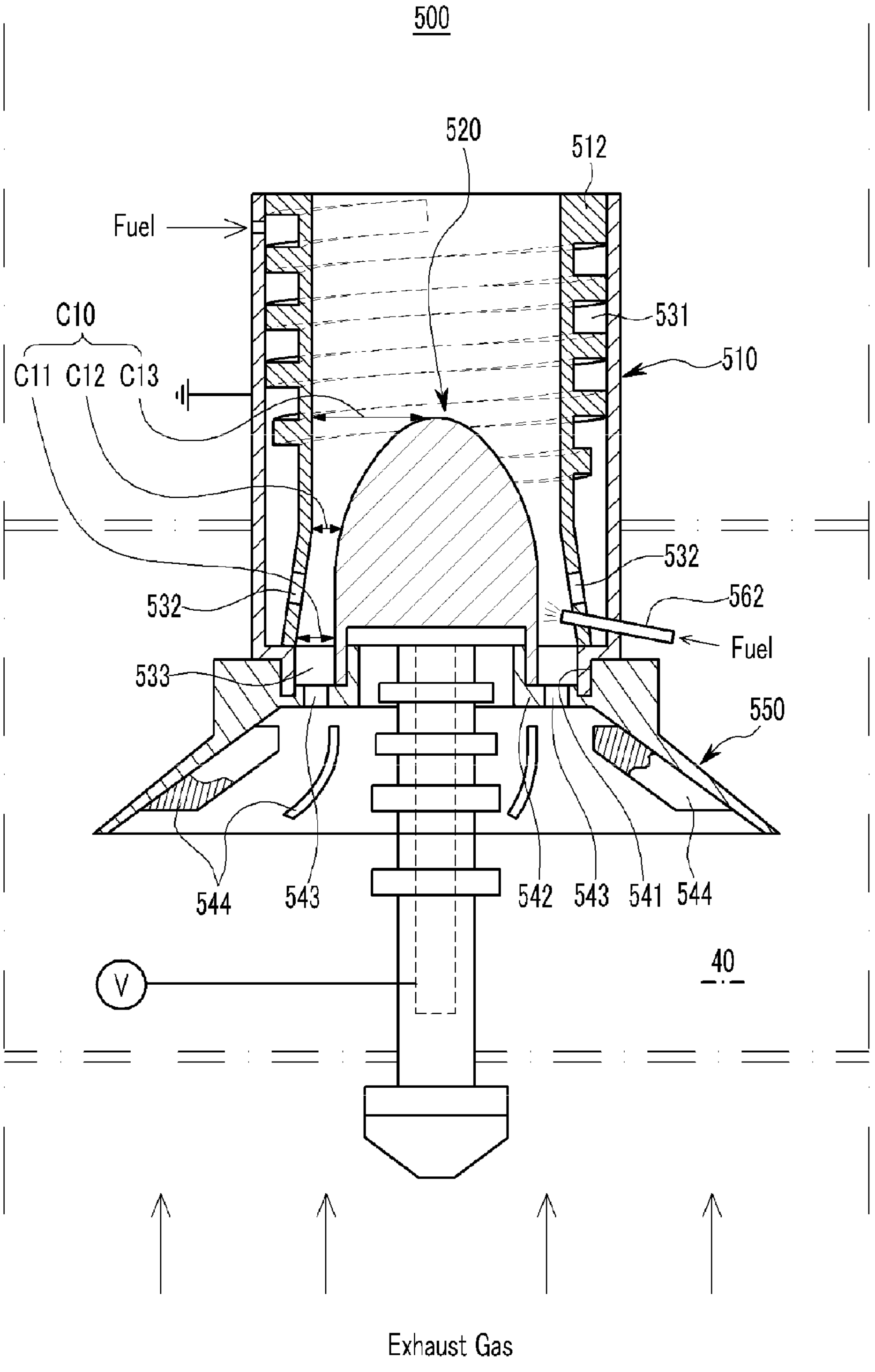
FIG. 30 is a cross-sectional view of a plasma burner according to a seventeenth exemplary embodiment of the present invention.

FIG. 30 is a cross-sectional view of a plasma burner according to a seventeenth exemplary embodiment of the present invention.

Referring to FIG. 30, the plasma burner 500 further includes a nozzle 562. The nozzle 562 is provided in the reaction furnace 510 in order to directly inject fuel to a space between the reaction furnace 510 and the electrode 520 to face a space between the reaction furnace 510 and the electrode 520.

The nozzle 562 may be added to a configuration of the preheating passage 531 and the fuel inlet 532 (see FIG. 30), and may be independently formed in a state where the preheating passage 531 and the fuel inlet 532 are not formed (not shown).

Fuel that is ejected from the nozzle 562 is supplied to the space between the reaction furnace 510 and the electrode 520. Because the nozzle 562 is positioned adjacent to the guide member 550, the fuel can be more effectively mixed with exhaust gas by a swirl flow by the guide member 550.

Figure 31:
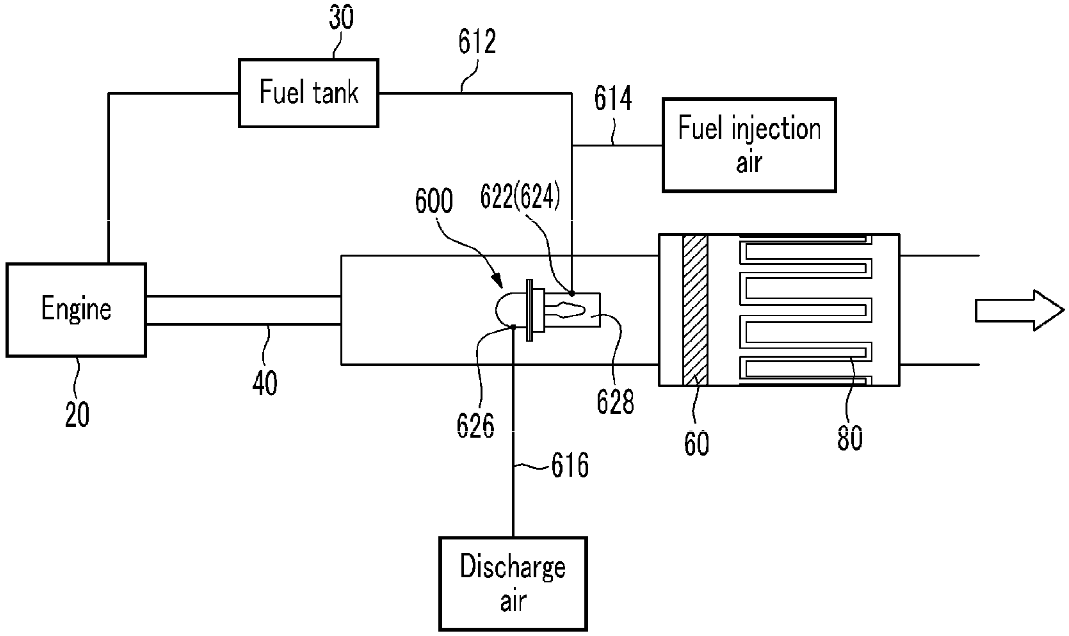
FIG. 31 is a block diagram of a DPF according to a eighteenth exemplary embodiment of the present invention.

FIG. 31 is a block diagram of a DPF according to a eighteenth exemplary embodiment of the present invention.

The DPF includes a fuel inflow conduit 612, an ejecting air inflow conduit 614, and a discharge air inflow conduit 616 that supply fuel, ejecting air, and discharge air, respectively, to a plasma burner 600.

The plasma burner 600 is provided within the exhaust conduit 40 between the engine 20 and the filter 80. The plasma burner 600 includes a fuel inlet 622, an ejecting air inlet 624, a discharge air inlet 626, and a flame vent 628 to be applied to the DPF.

The fuel inflow conduit 612 injects fuel into the plasma burner 600 by connecting the fuel inlet 622 and the fuel tank 30. The ejecting air inflow conduit 614 injects external air into the plasma burner 600 by connecting the ejecting air inlet 624 to the outside of the exhaust conduit 40. Ejecting air that is injected to the ejecting air inflow conduit 616 and the ejecting air inlet 624 ejects fuel that is injected to the fuel inflow conduit 612 and the fuel inlet 622 into the plasma burner 600.

The discharge air inflow conduit 616 injects external air into the plasma burner 600 by connecting the discharge air inlet 626 to the outside of the exhaust conduit 40. Discharge air that is injected to the discharge air inflow conduit 616 and the discharge air inlet 626 projects a flame that is generated by a plasma discharge that is generated in a mixed gas of fuel and air to the flame vent 628.

Figure 32:
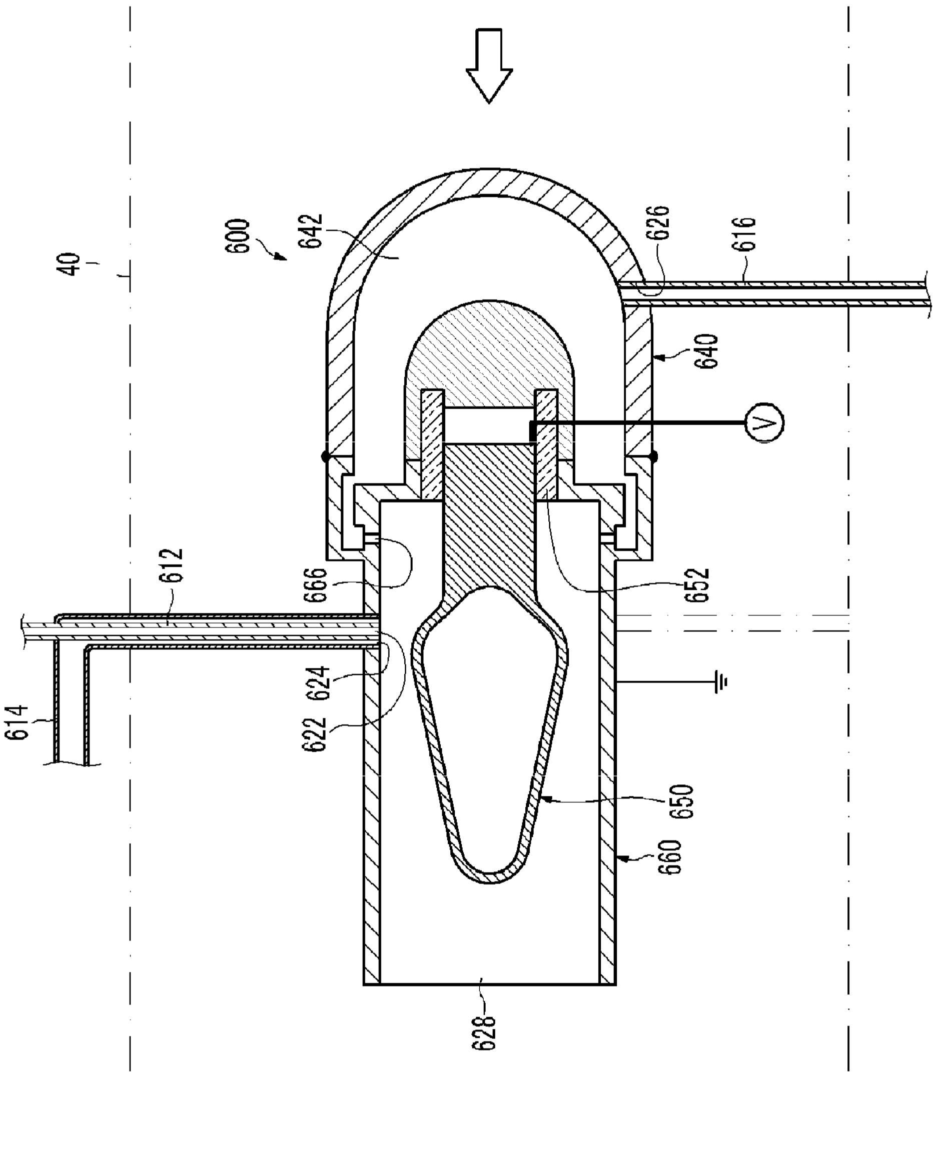
FIG. 32 is a cross-sectional view of the plasma burner shown in FIG. 31.

FIG. 32 is a cross-sectional view of the plasma burner shown in FIG. 31.

Referring to FIG. 32, the plasma burner 600 includes a base 640, an electrode 650, and a reaction furnace 660.

In the base 640, a discharge air inlet 626 are formed, and the base 640 includes a mixture chamber 642 that is formed at the inside thereof. The electrode 650 is mounted in the base 640 with an insulator 652 interposed therebetween. The insulator 652 electrically insulates the electrode 650 from the base 640 or the reaction furnace 660. The electrode 650 has a shape that is extended to an opposite side of the base 640 to form a maximum extension portion and that then gradually becomes narrow.

The fuel inflow conduit 612 is connected to the side of the reaction furnace 660 through the fuel inlet 622, thereby injecting the fuel directly into the inner space of the reaction furnace 660. The ejecting air inflow conduit 614 which is formed around the fuel inflow conduit 612 is connected with the reaction furnace 660 through the ejecting air inlet 624, and contribute to fuel injection via the fuel inlet 622.

Further, the fuel inflow conduit 612 and the fuel inlet 622 that supply fuel into the plasma burner 600 may be replaced with an injector (not shown) that directly injects fuel to the reaction furnace 660. The ejecting air inflow conduit 614 and the ejecting air inlet 624 may be omitted when the injector is adopted.

The discharge air inflow conduit 616 is connected to the mixture chamber 642. Discharge air that is supplied to the discharge air inflow conduit 616 ejects the mixed gas within the mixture chamber 642 into the reaction furnace 660 through the mixture gas nozzle 666.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A diesel particulate filter (DPF) trap comprising:
- a filter that is connected to an exhaust conduit at a side opposite to that of an engine;
- a plasma burner that is provided in the exhaust conduit between the engine and the filter, and that heats exhaust gas, wherein the plasma burner comprises
  - a fuel inlet that supplies fuel,
  - a flame vent that projects a flame by a plasma discharge,
  - a reaction furnace provided within the exhaust conduit,
  - an electrode provided within the reaction furnace that is separated from an internal wall of the reaction furnace by a gap, the plasma discharge being generated in the gap,
  - an ejecting air inlet that injects air for ejecting fuel that is injected to the fuel inlet,
  - a discharge air inlet that supplies discharge air into the plasma burner; and
  - a base that comprises a mixture chamber in which the fuel inlet, the ejecting air inlet, and the discharge air inlet are formed;
- a fuel inflow conduit that connects the fuel inlet and a fuel tank;
- an ejecting air inflow conduit connected to the ejecting air inlet; and
- a discharge air inflow conduct connected to the discharge air inlet,
- wherein the discharge air inflow conduit is connected to the mixture chamber of the base while passing across the exhaust conduit.

2. The DPF trap of claim 1, wherein:
- the electrode is mounted in the base with an insulator interposed therebetween, has a heat-absorbing chamber inside thereof, and mixes and heats fuel and air that are injected from the fuel inlet and the ejecting air inlet in a mixed gas state in the heat-absorbing chamber, and
- the reaction furnace connects the flame vent to the base, receives a mixed gas through a mixture gas nozzle that is connected to the mixture chamber, and projects the flame that is generated in the mixed gas by the plasma discharge between the electrode and the internal wall of the reaction furnace.

3. The DPF trap of claim 2, wherein a plurality of mixture gas nozzles are disposed with equal distances therebetween along a circumferential direction in the reaction furnace and are inclined by a preset angle in a central direction of a cylinder.

4. The DPF trap of claim 2, wherein:

the heat-absorbing chamber is formed at the center of the electrode, the ejecting air inflow conduit is connected to the heat-absorbing chamber, and the fuel inflow conduit is provided within the ejecting air inflow conduit to be connected to the heat-absorbing chamber.

5. The DPF trap of claim 1, wherein the plasma burner further comprises at least one exhaust gas inlet that supplies exhaust gas to a mixture chamber in which the fuel inlet, the ejecting air inlet, and the discharge air inlet are formed.

6. The DPF trap of claim 5, wherein:

the plasma burner further comprises a base that includes the mixture chamber, the electrode is mounted in the base with an insulator interposed therebetween, has a heat-absorbing chamber inside thereof, and mixes and heats fuel and air that are injected from the fuel inlet and the discharge air inlet in a mixed gas state in the heat-absorbing chamber, and the reaction furnace connects the flame vent to the base, receives a mixed gas through a mixture gas nozzle that is connected to the mixture chamber, and projects the flame that is generated in the mixed gas by the plasma discharge between the electrode and the internal wall of the reaction furnace.

7. The DPF trap of claim 6, wherein a plurality of mixture gas nozzles are disposed with equal distances therebetween along a circumferential direction in the reaction furnace and are inclined by a preset angle in a central direction of a cylinder.

8. The DPF trap of claim 6, wherein:

the heat-absorbing chamber is formed at the center of the electrode, the ejecting air inflow conduit is connected to the heat-absorbing chamber, and the fuel inflow conduit is provided within the ejecting air inflow conduit to be connected to the heat-absorbing chamber.

9. A diesel particular filter (DPF) trap comprising:

a filter that is connected to an exhaust conduct at a side opposite to that of an engine;

a plasma burner that is provided in the exhaust conduit between the engine and the filter, and that heats exhaust gas, wherein the plasma burner comprises a fuel inlet that supplies fuel, a flame vent that projects a flame by a plasma discharge, a reaction furnace provided within the exhaust conduit, and an electrode provided within the reaction furnace that is separated from an internal wall of the reaction furnace by a gap, the plasma discharge being generated in the gap; and a fuel inflow conduit that connects the fuel inlet and a fuel tank, wherein the reaction furnace comprises an exhaust gas inlet that mixes fuel that is injected into the reaction furnace through the fuel inlet with exhaust gas to create a mixed gas, and that is formed at an upstream side of the reaction furnace, wherein the flame vent is formed at a downstream side of the reaction furnace to project the flame by the plasma discharge of the mixed gas, and the diesel particulate filter (DPF) trap further comprising a guide member that is disposed at the exhaust gas inlet side and that is formed with a greater diameter than that of the exhaust gas inlet to induce the exhaust gas to the exhaust gas inlet.

10. The DPF trap of claim 9, wherein the reaction furnace further comprises:

an external cylinder that is exposed within the exhaust conduit; and an internal cylinder that is provided within the external cylinder to form a preheating passage between the internal cylinder and the external cylinder, wherein the preheating passage is connected to the fuel inflow conduit to preheat supplied fuel, and wherein, adjacent to the exhaust gas inlet, the internal cylinder has a progressively larger diameter toward the exhaust gas inlet.

11. The DPF trap of claim 10, wherein the fuel inlet is formed in the internal cylinder to connect the preheating passage with the reaction furnace and the electrode.

12. The DPF trap of claim 10, wherein the preheating passage is formed in a spiral structure advancing toward the exhaust gas inlet.

13. The DPF trap of claim 9, wherein an inside portion of the guide member comprises a plurality of veins that a swirl flow between the reaction furnace and the electrode.

14. The DPF trap of claim 1, further comprising a heat exchanger that is provided on the fuel inflow conduit.

15. The DPF trap of claim 1, wherein:

the electrode is mounted in the base with an insulator interposed therebetween, the reaction furnace connects the flame vent to the base and projects the flame that is generated by the plasma discharge between the electrode and the internal wall of the reaction furnace, the fuel inlet is formed on a side of the reaction furnace, and the fuel inflow conduit connects an inner space of the reaction furnace and the fuel tank through the fuel inlet.

* * * * *